United States Patent
Haviv et al.

(10) Patent No.: US 10,614,050 B2
(45) Date of Patent: Apr. 7, 2020

(54) MANAGING OBJECT REQUESTS VIA MULTIPLE INDEXES

(71) Applicant: Iguazio Systems Ltd., Herzliya (IL)

(72) Inventors: Yaron Haviv, Tel Mond (IL); Ori Modai, Ramat Hasharon (IL); Orit Nissan-Messing, Hod Hasharon (IL)

(73) Assignee: Iguazio Systems, Ltd., Herzliya (IL)

( * ) Notice: Subject to any disclaimer, the term of this patent is extended or adjusted under 35 U.S.C. 154(b) by 876 days.

(21) Appl. No.: 15/006,099

(22) Filed: Jan. 25, 2016

(65) Prior Publication Data

US 2016/0217166 A1 Jul. 28, 2016

Related U.S. Application Data

(60) Provisional application No. 62/107,423, filed on Jan. 25, 2015.

(51) Int. Cl.
*G06F 16/00* (2019.01)
*G06F 16/22* (2019.01)
(Continued)

(52) U.S. Cl.
CPC .......... *G06F 16/2228* (2019.01); *G06F 3/061* (2013.01); *G06F 3/067* (2013.01); *G06F 3/0649* (2013.01); *G06F 12/0897* (2013.01); *G06F 16/122* (2019.01); *G06F 16/13* (2019.01); *G06F 16/174* (2019.01); *G06F 16/211* (2019.01);
(Continued)

(58) Field of Classification Search
CPC ......... G06F 17/30321; G06F 17/30312; G06F 17/30424; G06F 17/30619; G06F 17/30616; G06F 17/30631; G06F 17/30094; G06F 17/30613; G06F 17/30336; G06F 17/3002; G06F 17/30233; G06F 17/30911; G06F 17/30946; G06F 16/13; G06F 16/22; G06F 16/2228; G06F 16/95; G06F 16/24573; G06F 16/2365; G06F 16/951
See application file for complete search history.

(56) References Cited

U.S. PATENT DOCUMENTS 5,685,003 A * 11/1997 Peltonen ............... G06F 16/328 715/202
5,724,575 A * 3/1998 Hoover ................... G06F 16/27
(Continued)

OTHER PUBLICATIONS

International Search Report for PCT/US2016/014778, dated Apr. 26, 2016 (all pages).
(Continued)

*Primary Examiner* — Merilyn P Nguyen
(74) *Attorney, Agent, or Firm* — FisherBroyles, LLP; Ariel Reinitz

(57) ABSTRACT

Systems, methods, and related technologies for application-centric object storage and managing object requests via multiple indexes are described. In certain aspects, a processing device can receive a first data object, generate, with respect to the first data object, a first index, generate, with respect to the first data object, a second index through which the first data object can be accessed, receive a request with respect to the first data object, process the request to determine which of the first index or the second index to utilize in completing the request, and complete the request via at least one of the first index or the second index.

32 Claims, 9 Drawing Sheets

(51) Int. Cl.
    *G06F 16/13*     (2019.01)
    *G06F 16/174*    (2019.01)
    *G06F 16/21*     (2019.01)
    *G06F 16/23*     (2019.01)
    *G06F 16/2457*   (2019.01)
    *G06F 3/06*      (2006.01)
    *G06F 16/11*     (2019.01)
    *G06F 12/0897*   (2016.01)

(52) U.S. Cl.
    CPC .... *G06F 16/2365* (2019.01); *G06F 16/24573* (2019.01); *G06F 2212/60* (2013.01)

(56) References Cited

U.S. PATENT DOCUMENTS

| | | | | |
|---|---|---|---|---|
| 5,960,194 | A * | 9/1999 | Choy | G06F 9/355 |
| 7,213,013 | B1 * | 5/2007 | Subramaniam | G06Q 10/10 |
| | | | | 707/610 |
| 7,444,343 | B2 * | 10/2008 | Wang | G06F 16/9537 |
| 7,882,098 | B2 * | 2/2011 | Prahlad | G06F 16/951 |
| | | | | 707/706 |
| 8,650,164 | B2 * | 2/2014 | Rothschild | G06F 16/13 |
| | | | | 707/693 |
| 8,983,967 | B2 * | 3/2015 | Molaro | G06F 16/278 |
| | | | | 707/741 |
| 2009/0132494 | A1 * | 5/2009 | Gutlapalli | G06F 17/30011 |
| 2010/0333116 | A1 | 12/2010 | Prahlad et al. | |
| 2013/0151535 | A1 * | 6/2013 | Dusberger | G06F 16/2272 |
| | | | | 707/747 |
| 2013/0304746 | A1 * | 11/2013 | Dhuse | G06F 16/322 |
| | | | | 707/743 |
| 2014/0059005 | A1 * | 2/2014 | Carmichael | G06F 17/30094 |
| | | | | 707/626 |
| 2014/0258236 | A1 * | 9/2014 | Vijayan | G06F 16/113 |
| | | | | 707/639 |
| 2016/0055191 | A1 * | 2/2016 | Joshi | G06F 3/04842 |
| | | | | 707/744 |

OTHER PUBLICATIONS

"Intelligent Data Management Required When Implementing a Modern Storage Infrastructure" Sep. 30, 2014. Retrieved from the Internet: http://cognitiveimpact.com/media/technicalpapers/WP_Arkivio_Arkivio_Autostor.pdf (all pages).

\* cited by examiner

MANAGING OBJECT REQUESTS VIA MULTIPLE INDEXES

CROSS-REFERENCE TO RELATED APPLICATIONS

This application is related to and claims the benefit of U.S. Patent Application No. 62/107,423, filed Jan. 25, 2015 which is incorporated herein by reference in its entirety.

TECHNICAL FIELD

Aspects and implementations of the present disclosure relate to data storage and processing, and more specifically, to application-centric object storage and managing object requests via multiple indexes.

BACKGROUND

In many common scenarios and settings, data (e.g., as stored in files, objects, records, etc.) may be accessible to and/or shared by numerous applications, users, etc. Requests/attempts to modify such data may be received from multiple sources and the processing of such requests must be managed in order to ensure that the data remains consistent and is not corrupted. One approach to managing such requests entails 'locking' the data and processing the referenced requests sequentially. However, such an approach entails considerable inefficiencies and can limit the performance of applications that may depend on the referenced data.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In one aspect of the present disclosure, a processing device can receive one or more requests with respect to a data object from a first application. The processing device can process the one or more requests to identify one or more substructures of the data object. Based on an identification of the one or more substructures of the data object, the processing device can define a storage structure for the data object. The processing device can then define an interface through which the first application can provide data access commands to the data object as stored in the defined storage structure.

In another aspect of the present disclosure, a processing device can receive a data object in a first format. The processing device can generate, with respect to the data object, a first index. The processing device can generate, with respect to the data object, a second index through which the data object can be accessed in a second format. The processing device can receive a request with respect to the data object. The processing device can process the request to determine which of the first index or the second index to utilize in completing the request. The processing device can complete the request via at least one of the first index or the second index.

In another aspect of the present disclosure, a processing device can receive, from an application, one or more requests with respect to a data object. The processing device can process the one or more requests to determine one or more data utilization characteristics of the application with respect to the data object. The processing device can configure one or more aspects of the data object in view of the one or more data utilization characteristics.

In another aspect of the present disclosure, a processing device can process a first data object in a first format to generate a virtual data object, the virtual data object comprising a representation of the first data object in a second format. The processing device can receive a request with respect to the first data object from an application that is configured with respect to the second format. The processing device can complete the request with respect to the first data object and the application via the virtual data object.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
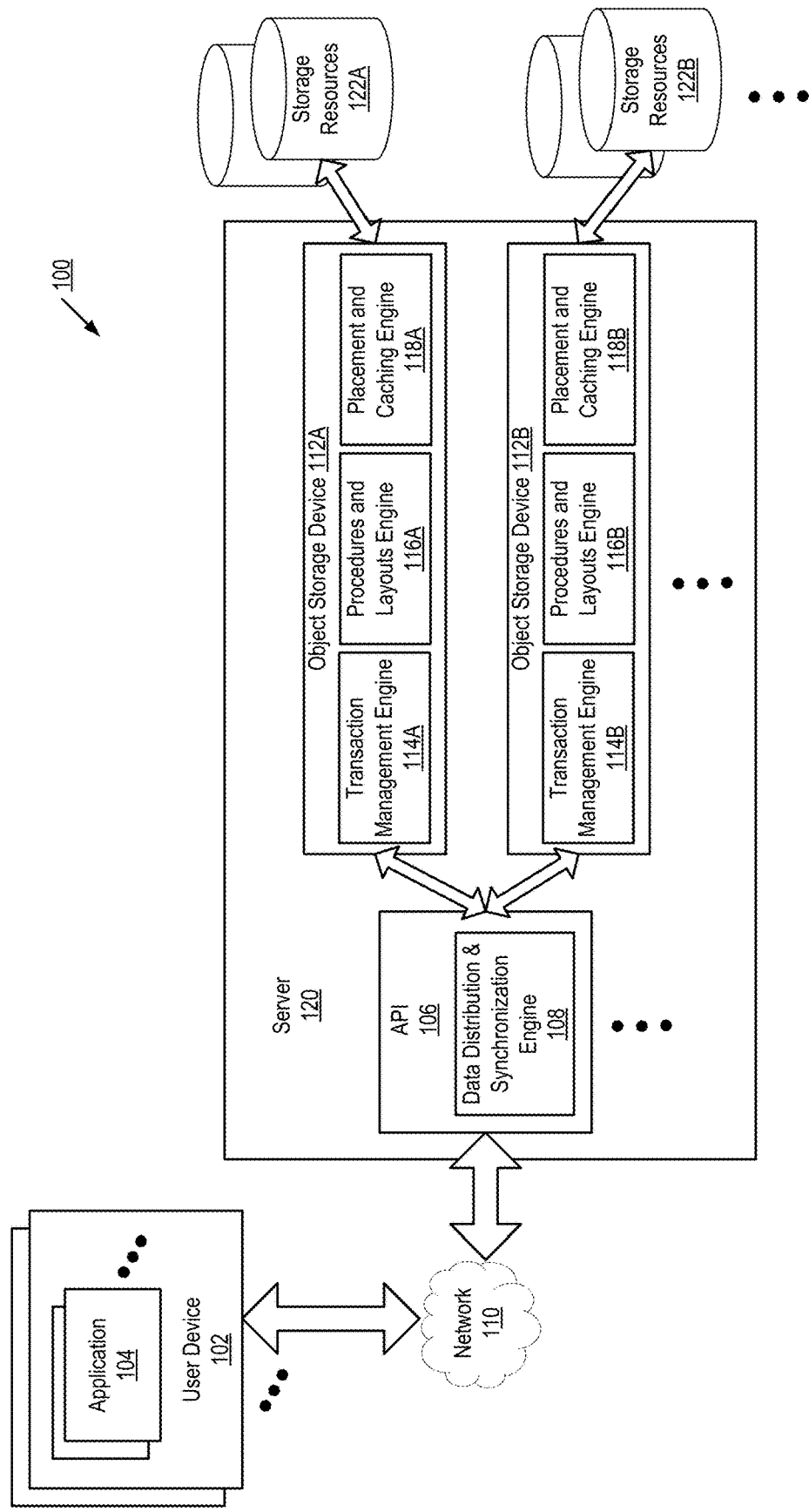
FIG. 1 depicts an illustrative system architecture, in accordance with one implementation of the present disclosure.

Aspects and implementations of the present disclosure are directed to application-centric object storage and managing object requests via multiple indexes.

By way of overview and introduction, it can be appreciated that with recent trends of exponential data growth, including the growth of unstructured data, 'big Data,' analytics, and the Internet of Things (IoT), ensuring that data is processed, stored, and consumed as efficiently as possible has become increasingly critical. Large amounts of data are often stored in files, objects, and/or records. In many scenarios and settings, such stored data may need to be accessed and/or shared (at times, simultaneously) by numerous users, devices, services, applications, etc. It should also be noted that in many cases such data may not be stored in its original form, as it may be processed and/or stored in a more compact and/or structured way. Such data may also change forms at various points in time and/or may be processed by multiple application stages.

Additionally, in scenarios in which data is modified by multiple sources (e.g., multiple users, services, applications, etc.) the potential for conflict arises. For example, one application may attempt to read the referenced data at the same time it is being modified (e.g., by another application), thereby leading to inconsistencies with respect to the manner in which the data is reflected across the applications. Moreover, in certain scenarios it may be advantageous and/or necessary to replicate data (e.g., to store it in multiple locations) and it may therefore be important to synchronize modifications made to such data to ensure consistency across the multiple copies of the data.

In many scenarios it may be advantageous and/or necessary for an application to read the data, modify it, and then write it back. During such a process, it may be advantageous and/or necessary to prevent other applications from modifying the same data, so as to avoid data corruptions or inconsistencies. For example, locks can be used to block other applications, etc. from accessing the data while it is being updated. However, while such an approach can ensure that the data is not corrupted, such locks can limit the overall performance of the system.

It may also be advantageous and/or necessary to provide notification(s) to certain application(s), e.g., in order to inform them as to when data is being modified (as it may be advantageous and/or necessary for such applications to initiate various actions, commands, etc. with respect to the data once such data has been updated). Such an approach can, for example, be more efficient than constantly/continuously reading the referenced data and/or its associated metadata (e.g. metadata that reflects the last date the data was updated) and checking/determining whether it has been modified. Additionally, the referenced notification(s) may be utilized, for example, in scenarios in which an application, service, etc., awaits a certain number of changes to be performed so that a larger dataset can be worked on more efficiently.

In order to address the challenges referenced above, one or more layers of software can be added above the data which may, for example, access, monitor, and/or manipulate the data. However, such an approach entails multiple challenges. For example, being that the data can be of enormous volume and velocity (e.g., multiple modifications/updates may be made to it over a relatively short time period) and may be scattered in multiple locations, providing the referenced software layer(s) can require significant resources, and may not be sufficiently scalable and/or efficient.

Additionally, employing applications that are otherwise unrelated to/disconnected from the actual file or object storage of the data itself does not enable optimizing the approach and/or tuning storage layer logic (e.g., caching logic, pre-fetching, tiering between different performance and capacity storage resources, internal data organization, etc.) to be aligned with the application requirements.

Moreover, it can be appreciated that applications can have a long latency when accessing a data storage system. Accordingly, when implementing multi-stage transactions it may be necessary to lock the data resources for a long period of time, resulting in poor overall performance and inefficient use of time and resources.

Additionally, applications may drive/initiate too many input/output (I/O) requests to implement a single data operation, thereby inflicting too much overhead on the storage systems.

In light of the above challenges and shortcomings in existing technologies/approaches, it may be advantageous to move certain processing capabilities/operations closer to the data itself (e.g., where the data is stored) while providing more effective data access interfaces (e.g., application program interfaces or 'APIs'). Such APIs can, for example, allow users to run transactions, optimize the storage resources and logic with respect to the needs of specific application(s), etc. In doing so, fewer I/O requests can be conducted, less data can be stored, and applications can be notified about changes in the data at the appropriate time(s).

One such approach is to provide application-specific storage (e.g., storage specifically configured for video, on line transaction processing ('OLTP,'), data warehousing, web content, in memory data processing, etc.) and to form multiple partially utilized silos, each managed independently and having a reduced set of features. However, such an approach may create challenges when attempting to share the data with an external application or user. In such a scenario, instead of sharing or otherwise providing access to the data itself, such data may instead need to be copied between systems (e.g., manually), and multiple copies of such data may be made at different points in time (being that the data is constantly/consistently updated).

Another approach may be to create complex systems which run multiple applications on the data storage systems, or to build applications which are tightly coupled with the data storage, however, such solutions are difficult to scale.

Yet another approach is to utilize a SQL database management system (DBMS) to manage the data and to provide high-level data and transaction services. However, such an approach is not scalable and led to the creation of many "NoSQL" solutions such as Hadoop®, MongoDB®, Cassandra™, Riak®, etc. Additionally, such systems do not provide the same level of functionality or consistency or cross data querying capabilities such as traditional DBMS, or they do it in a resource intensive way which compromises the performance of the system Accordingly, described herein are technologies that enable data storage and management to be defined, configured, and/or optimized based on various factors and/or characteristics, such as the data access patterns of various applications. For example, the operation of a particular application and/or its associated data and access patterns can be considered in defining, configuring, and/or optimizing how the data is stored/packaged. In doing so, the data can be stored/provided in units that correspond to/reflect the manner in which the data is actually utilized within the application (as opposed to storing/packaging the data in blocks and/or full data files that are otherwise unrelated to the manner in which the application utilizes the data). Additionally, in doing so, tiering, etc. of the data can actually works with the application (and not against it).

FIG. 1 depicts an illustrative system architecture 100, in accordance with one implementation of the present disclosure. The system architecture 100 includes one or more user devices 102, server 120, and one or more storage resources 122. These various elements or components can be connected to one another via network 110, which can be a public network (e.g., the Internet), a private network (e.g., a local area network (LAN) or wide area network (WAN)), or a combination thereof. Additionally, in certain implementations various elements may communicate and/or otherwise interface with one another (e.g., user device 102 with server 120).

User device 102 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, a wearable device, any combination of the above, or any other such computing device capable of implementing the various features described herein. Various applications 104, such as mobile applications ('apps'), web browsers, etc. may run on the user device (e.g., on the operating system of the user device). It should be understood that, in certain implementations, user device 102 can also include and/or incorporate various sensors and/or communications interfaces (including but not limited to those depicted in FIG. 2 and/or described herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

Figure 2:
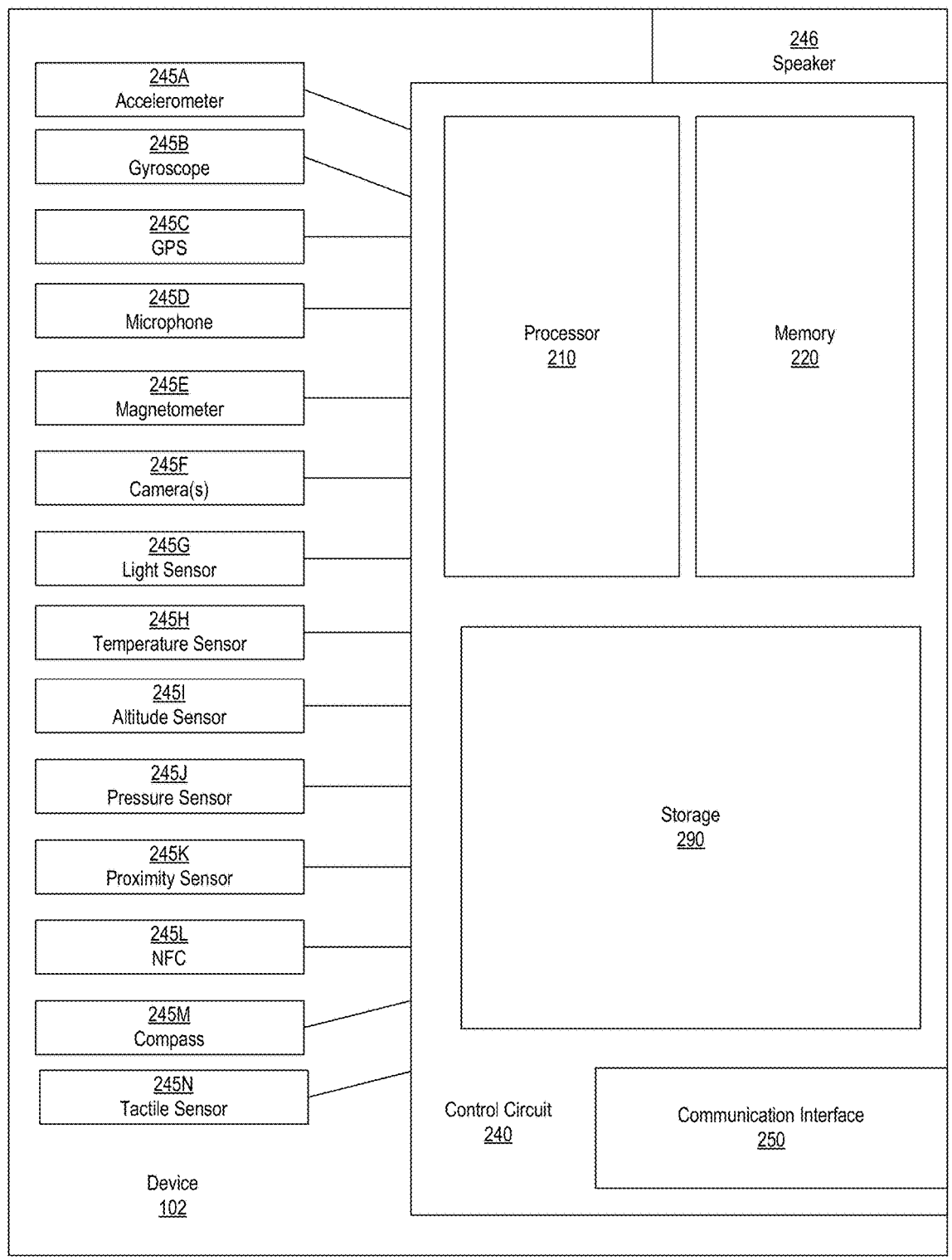
FIG. 2 depicts an exemplary implementation of a device in accordance with aspects and implementations of the present disclosure.

As noted, in certain implementations, user device(s) 102 can also include and/or incorporate various sensors and/or communications interfaces. By way of illustration, FIG. 2 depicts one exemplary implementation of user device 102. As shown in FIG. 2, device 102 can include a control circuit 240 (e.g., a motherboard) which is operatively connected/coupled to various hardware and/or software components that serve to enable various operations, such as those described herein. Control circuit 240 can be operatively connected to processor 210 and memory 220. Processor 210 serves to execute instructions for software that can be loaded into memory 220. Processor 210 can be a number of processors, a multi-processor core, or some other type of processor, depending on the particular implementation. Further, processor 210 can be implemented using a number of heterogeneous processor systems in which a main processor is present with secondary processors on a single chip. As another illustrative example, processor 210 can be a symmetric multi-processor system containing multiple processors of the same type.

Memory 220 and/or storage 290 may be accessible by processor 210, thereby enabling processor 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above. Storage 290 also can be fixed or removable.

A communication interface 250 is also operatively connected to control circuit 240. Communication interface 250 can be any interface (or multiple interfaces) that enables communication between user device 102 and one or more external devices, machines, services, systems, and/or elements (including but not limited to those depicted in FIG. 1 and described herein). Communication interface 250 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 102 to other computing devices, systems, services, and/or communication networks such as the Internet. Such connections can include a wired connection or a wireless connection (e.g. 802.11) though it should be understood that communication interface 250 can be practically any interface that enables communication to/from the control circuit 240 and/or the various components described herein.

At various points during the operation of described technologies, device 102 can communicate with one or more other devices, systems, services, servers, etc., such as those depicted in FIG. 1 and/or described herein. Such devices, systems, services, servers, etc., can transmit and/or receive data to/from the user device 102, thereby enhancing the operation of the described technologies, such as is described in detail herein. It should be understood that the referenced devices, systems, services, servers, etc., can be in direct communication with user device 102, indirect communication with user device 102, constant/ongoing communication with user device 102, periodic communication with user device 102, and/or can be communicatively coordinated with user device 102, as described herein.

Also connected to and/or in communication with control circuit 240 of user device 102 are one or more sensors 245A-245N (collectively, sensors 245). Sensors 245 can be various components, devices, and/or receivers that can be incorporated/integrated within and/or in communication with user device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein.

At this juncture it should be noted that while the foregoing description (e.g., with respect to sensors 245) has been directed to user device 102, various other devices, systems, servers, services, etc. (such as are depicted in FIG. 1 and/or described herein) can similarly incorporate the components, elements, and/or capabilities described with respect to user device 102. It should also be understood that certain aspects and implementations of various devices, systems, servers, services, etc., such as those depicted in FIG. 1 and/or described herein, are also described in greater detail below in relation to FIG. 9.

Server 120 can be a rackmount server, a router computer, a personal computer, a portable digital assistant, a mobile phone, a laptop computer, a tablet computer, a netbook, a desktop computer, a smartphone, a media center, any combination of the above, or any other such computing device capable of implementing the various features described herein. Server 120 can include components such API 106 and various object storage devices (OSD) 112. It should be understood that, in certain implementations, server 120 can also include and/or incorporate various sensors and/or communications interfaces (including but not limited to those depicted in FIG. 2 and described in relation to user device 102). The components can be combined together or separated in further components, according to a particular implementation. It should be noted that in some implementations, various components of server 120 may run on separate machines. Moreover, some operations of certain of the components are described in more detail below.

As depicted in FIG. 1, server 120 can include one or more APIs 106 through which applications 104 (e.g., those executing on user devices 102) communicate with server 120, such as in order to access and/or otherwise interact with data stored on storage resources 122, such as in a manner described herein. It should be understood that in various implementations API 106 may utilize local function calls, inter-process communication, and/or remote access (e.g., through various network based protocols) in order to enable communication between the application and the storage resources. Additionally, API 106 can include, incorporate, and/or otherwise operate in conjunction with data distribution and synchronization engine 108. In certain implementations, data distribution and synchronization engine 108 can define and/or configure various aspects of the distribution and/or synchronization of data, such as is described in greater detail herein.

As also depicted in FIG. 1, server 120 can include one or more object storage devices (OSD) 112 (e.g., OSD 112A and 112B). While OSD 112A and 112B are both depicted as being present on server 120, it should be understood that in other implementations various OSDs may be present on different machines. In certain implementations, an object storage device 112 can contain various elements including transaction management engine 114, smart data procedures and layouts engine 116, and data placement and caching engine 118.

Transaction management engine 114 can manage the execution order of various requests, as well as the potential distribution and/or replication of the system state or data with other OSDs. Additionally, transaction management engine 114 can execute individual requests and/or a set of coupled requests in an atomic and consistent way with minimal (if any) locking of the data.

In certain implementations, transaction management engine 114 may utilize a concurrency control method such as MVCC (Multi-Version Concurrency Control) with optional serialization of write conflicts or explicit 2PC (2 Phase Commit) locks (e.g., in case of critical updates). In doing so, execution order and consistency can be maintained.

It should be understood that transaction management engine 114 can be configured to manage transactions including read transactions which may be performed based on a transaction version of the pertinent data. In certain implementations, a local snapshot (version) of the objects or groups of objects that pertain/relate to the read transaction can be created. Those fragments which belong to the referenced snapshot may be precluded from being deleted/written over during the life of the transaction(s). Instead, write commands can be generated/provided, e.g., to update newer versions of the corresponding data (in lieu of making changes to the referenced snapshot).

Transaction management engine 114 can also be configured to manage write transactions. It should be understood that the referenced write transaction may be atomic write transactions which may either execute or fail. When one write transaction is being performed, transaction management engine 114 can ensure that subsequent write transaction(s) wait for the completion of the ongoing write transaction. When a read request is received during the performance of a write transaction, transaction management engine 114 can provide a previous version of the requested data in response to the the read request, or transaction management engine 114 can wait for the end of the transaction before responding (e.g., if the request specifies that is requires the latest version of the data).

Transaction management engine 114 can also be configured to manage read/modify/write transaction(s), which may be atomic reads/writes operations. In doing so, transaction management engine 114 can ensure that no other write operations are performed on the relevant/pertinent data objects (e.g., those with respect to which the referenced read/modify/write transaction is being performed) during the transaction, e.g., from the first read to last write. In certain implementations, such transactions can be performed in a synchronous manner, e.g., read results must be received before a write operation can be performed (which may require longer lock on the relevant objects, e.g., from start to finish of the transaction). In other implementations, an 'optimistic' approach can be taken (e.g., in order to avoid locking the data during the transaction), though the transaction may need to be retried, e.g., in case of conflict detection (such as if another application updates an object that was modified during the transaction). In yet other implementations, transaction management engine 114 can be configured to take write locks only on elements that are read.

Transaction management engine 114 can also be configured to implement various stored procedures such as are described herein, such as server side atomic transactions. Such transactions may require server side pre-defined procedures, e.g., in order to avoid locks. Doing so may entail the passing of a procedure name and/or a parameters dictionary.

Smart data procedures and layouts engine 116 can execute one or more data processing tasks, and can organize data elements within an object in an application optimized and/or storage optimized manner, such as is described herein.

It can be appreciated that in many applications, various files and/or objects that are utilized by such application(s) may have an internal structure. Accounting for the internal structure of the referenced files/objects can be used to improve/optimize various data-related operations, such as saving various I/O operations (which may have otherwise been performed when not accounting for the referenced structure of the files/objects), implementing improved/optimal caching logic, placing the data in optimal storage tiers (e.g., based on the usage of internal structures within the object), offloading search, indexing, or filtering logic, and/or avoiding costly shifting of data structures within the object. In certain implementations, smart data procedures and layouts engine 116 can be configured to implement operations including lookup, filtering, snapshots, backups, carrying out caching or other forms of tiered data storage and disk management, while accounting for the data organization and update history specific or optimal to the given usage pattern of the relevant data and data structure.

As described herein, procedures and layouts engine 116 can be configured to define/model layouts for practically any application and/or data type. Nevertheless, in certain implementations various common data layouts can be modeled and/or provided (e.g., in order to improve the efficiency of the application and/or storage resources) including but not limited to:

A record storage layout, which may include one or more objects, each of which includes a set of records. Each of the records may have a variable size (so it may not be possible to identify/determine the location of each record without reading the object and processing it upfront or without creating a set of primary or secondary indexes). A record optimized object can sub-divide the objects into a header portion and a set of indexed records. Doing so can allow updating and/or reading of one or more records, e.g., based on a given criteria, and can also enable changes in record size or deletions to be handled without shifting content within the object.

A log file layout can account for the fact that log files may be appended continuously with a structure based on rows with time stamps, and after they file reaches a certain size a new log file is created (and the old file(s) are often deleted, e.g., after a certain period of time). Rather than requiring an application to read/process all of the log file(s) in order to determine which log file to read, procedures and layouts engine 116 can create/employ a log-optimized structure. Such a log-optimized structure can allow log records to be added, enable the retrieval/reading of log entries (e.g., based on the time-data and/or other row attributes), and delete the beginning of the log file when needed (e.g. based on policy such as max retention time) (e.g., instead of creating new log files again and again).

Procedures and layouts engine 116 can create/employ various structures that can improve/optimize the management of time series data (e.g., data that is counted and/or sampled on a periodic basis). Being that such time series data continues to grow as time goes on, at various intervals certain time-based data can be purged (e.g., by deleting older samples) and/or aggregated/compressed (e.g., by calculating an average, minimum and/or maximum of multiple samples, thereby combining them into a single sample). Being that when time series data is read it is often with respect to a given time range, an optimized time series can be provided, which can allow a simpler/more efficient user API which requires relatively fewer I/O requests. Additionally, the automated purging and deletion of old data can be simplified, simple queries can be used to obtain range-based data, and optimal storage tiering can be arranged, e.g., with the most frequently accessed data and/or metadata placed in higher performance tiers.

Procedures and layouts engine 116 can also create/employ various structures that can improve/optimize the management of time-based values. Such time-based values can be similar to the time series as described above, as such data is often collected periodically (e.g., per element or sensor) and in many cases the same sample data may repeat across multiple samples. Rather than duplicating the data records for every sample, procedures and layouts engine 116 can be configured to indicate the time range and occurrences for each data record (thus, for example, a single record of a particular value or input can be stored, together with records of the various time/date intervals at which such a value occurred—e.g., in lieu of storing separate records for each occurrence of the same value). In doing so, storage space for such data can be saved and analytic applications which may need to process the data can be accelerated.

Procedures and layouts engine 116 can also create/employ various structures that can improve/optimize the management of media content such as audio and/or video streams. For example, video files can include metadata and streams of audio and video captures which are arranged by time. It can be appreciated that in order for an application 104 to read video at a certain time offset, the corresponding metadata may need to be processed, e.g., in order to identify the relevant stream sections (which can then be read). In addition various video-based applications (e.g. surveillance applications) may need to tag portions of such video streams with additional metadata, retrieve objects or stream sections based on such metadata, and/or modify the resolution or format of the video or audio content. Procedures and layouts engine 116 can enable the offloading of some or all of the referenced operations (e.g., closer to the described object storage) where such operations can be performed more efficiently (e.g., as opposed to performing them at device 102 which may, for example, be a mobile device with relatively fewer resources) and/or can save considerable bandwidth. In addition, improved or 'smart' pre-fetching of the video and audio streams can be conducted (e.g., based on previous requests), thereby further improving efficiency.

Procedures and layouts engine 116 can also create/employ various structures that can improve/optimize the management of message queuing. For example, certain data records may be 'pushed' or otherwise provided by one or more data sources and 'pulled' or otherwise requested/received by one or more consumers. In certain implementations, one or more APIs can be provided which, for example, add data to the tail of an object, while reading or clearing data from the head of the object. Such APIs can also be configured to separate 'fast' data (e.g., data that was just written and will be read shortly) from 'slow' data (which was already read by one or more consumers and thus can move to a lower cost/priority storage media). In certain implementations, the described data object can be arranged as a stack (e.g., with 'push' and 'pop') and/or as a message queue. Additionally, in certain implementations various read and write pointers can be provided and the object can cycle to the start when reaching the end. In scenarios in which a single client requests each message once, once the client reads a pending message a read pointer may be advanced to the last read byte, or, alternatively, once data is pulled it can be deleted (such that the next time the client pulls the next message can be provided). Various policies can also be applied such that, for example, data that was read already can be stored in an archive (e.g., for a certain amount of time before being deleted). The described techniques can also be applied to a number of readers and/or writers, such that, for example, each reader can be associated with its own read pointer. In such a scenario the reader can, for example, provide a set of conditions or filters, through which only those messages, content, etc., that satisfy the criteria dictated by the filters are provided.

As described herein, the described technologies can provide application-specific interfaces (e.g., APIs such as API 106) that are directed and/or otherwise configured towards one or more of the applications, data types, and/or data layouts described and/or referenced herein. As noted, the various applications, data types, and/or data layouts referenced herein are merely exemplary and the described technologies can be similarly configured and/or otherwise extended to other applications, data types, and/or data layouts, etc. Such data layouts can include data objects which can be sub-divided into various internal structures, as described herein. For example a message queue can be made up of a set of messages, a log file can be made up of a set of time-based log entries, a database table can be made up of a set of row data records, and files can be made up of a set of data extents.

While in certain implementations different applications, data types, and/or data layouts can entail different data objects, in other implementations different views can be employed, e.g., for data having a single internal structure. For example, portions of message queue can be viewed as a contiguous file, while a set of log entries can be transformed to a database or a key/value table view where each log entry represents a row, etc. Such a polyglot API can enable the described technologies to provide multiple interfaces and APIs to the same data, thereby eliminating the need for redundant and inconsistent copies, and further simplifying the management of such data.

Data placement and caching engine 118 can identify/determine the optimal storage media to store the data in, and can also implement application-optimized data caching, tiering, and pre-fetching. That is, it can be appreciated that data may be stored in memory and/or in multiple storage repositories/resources 122 (which may be organized by 'tiers'), each of which may be associated with a particular cost, performance and/or functionality advantage. Examples of such storage resources/tiers can include but are not limited to: volatile and non-volatile memory, multi-level cell (MLC) flash memory (e.g., for mixed read/write workloads), triple level cell (TLC) flash memory (e.g., for reading mostly high Input/Output Operations Per Second, (IOPs), low-latency, or power sensitive workloads), SAS or SATA attached hard disk drives (e.g., for capacity), SAN or NAS storage, network attached object disks (e.g. Seagate ® Kinetic), and/or cloud storage or backup systems. It should also be understood that the referenced storage resources/tiers can be a combination of multiple storage resources (including but not limited to those referenced herein).

As noted, data placement and caching engine 118 can be configured to maximize application performance at the lowest overall costs, while also maximizing data availability. To do so, various application-aware data tiering techniques and/or policies can be employed. Such techniques/policies can be based on one or more factors including but not limited to: the size of the file to be stored (e.g. smaller files can be promoted to faster storage), whether the file is one of the most frequently used (MFU) and/or most recently used (MRU) objects (in which case, for example, store the object in a faster tier), the age of the data (e.g. demote files that are older than a defined threshold), sequential vs. random reads, sequential vs. random writes, user specified policy and/or object types, schedule-based (e.g., based on user/application defined and/or learned policies), explicit "pre-fetch"/"touch" by the application (e.g., through the API), and/or a write frequency/endurance (e.g., not to exceed Diskful Writes Per Day (DWPD) defined for the pool). In doing so, data placement and caching engine 118 can account for the particular application that is storing and/or likely to be retrieving the data (as well as other data associated with such data being stored/retrieved) in determining how to best store/package such data (e.g., in the units in which the data is used within the application). In doing so, various tiering and other operations can actually enhance (as opposed to hinder) etc. works with the application and not against it Storage resources 122 may be directly connected and/or remote storage resources which store the objects described/referenced herein and/or their fragments/extents. In various implementations, storage resources 122 can be one or more storage devices, such as main memory, magnetic or optical storage based disks, tapes or hard drives, NAS, SAN, and so forth. In some implementations, storage resources 122 can be a network-attached file server, while in other implementations storage resources 122 can be some other type of persistent storage such as an object-oriented database, a relational database, and so forth. It should be understood that while storage resources 122 is depicted as being independent of server 120 (e.g., as a connected or remote device), in certain implementations storage resources 122 may also be hosted by the server 120.

As described in detail herein, the described technologies can enable applications 104 (such as those executing on clients such as devices 102) to access stored data via a local or remote API 106. The API 106 can process requests from such applications 104 and direct the requests to one or more OSDs 112 (e.g., based on the object(s) to which such requests are directed) by using, for example, a deterministic or statistical (hash) mapping function, or a combination of deterministic and statistic mapping. In certain implementations, API 106 may break or shard a single request into multiple child requests or transactions which may, for example, be directed to multiple OSDs (e.g., OSD 112A and 112B). Moreover, in certain implementations API 106 may be configured to combine multiple responses (e.g., as received from the different OSDs) to form a single response that can be provided back to the requesting application 104.

It should be understood that though FIG. 1 depicts server 120 device 102, and storage resources 122 as being discrete components, in various implementations any number of such components (and/or elements/functions thereof) can be combined, such as within a single component/system. For example, in certain implementations server 120 can incorporate features of device 102.

Described herein in various implementations are technologies that enable application-centric object storage as well as the improved utilization and/or optimization of data storage and management (e.g., based on data access patterns of one or more application(s)). In certain implementations, such technologies can encompass operations performed by server 120 and/or in conjunction with APIs 106 and OSDs 112.

As described herein, the disclosed technologies move/shift various aspects of the processing, caching, and/or transaction semantics closer to the data and distribute such operations efficiently over multiple data management nodes. Both legacy and emerging DBMS solutions can thus be made to scale to manage significantly more data with fewer resources, at greater performance, and without compromising on data consistency, durability, or transaction semantics.

In certain implementations, the described technologies can provide/enable improved data access primitives and/or APIs in the data storage system. Such primitives and/or APIs can enable applications to offload data transaction processing and synchronization operations/responsibilities to the data storage system(s). The referenced primitives and/or APIs can also generate and/or provide suggestions or 'hints,' e.g., to the data storage system, with respect to how to place, store, package, and/or process the data. Additionally, the referenced primitives and/or APIs can enable the use of improved and/or optimal data layout(s) or compression in the storage system. Moreover, in certain implementations the referenced primitives and/or APIs can request notifications from a data storage system, such as with respect to changes to the data or associated metadata.

It should be understood that data elements (such as are described and/or referenced herein) may be referred to as data objects. Such data elements/objects can be represented in different data forms, including but not limited to: files, objects, block storage, database records, key/value tuples, media streams, data streams, messages, files, time series data, etc., and/or any other such data form. Additionally, in certain implementations the referenced data objects may include but are not limited to content, metadata, versions, and state or context, and such objects may be copied in multiple locations (e.g., as described herein). As described herein, the referenced data objects can be consumed and/or produced using various and/or multiple APIs and/or data models (for example, data may be generated/stored as a stream and may also being read as a file). By providing improved APIs through which the referenced data objects can be accessed, the described technologies can enable/provide application centric object storage, such as is described herein.

The referenced application centric object storage can provide/enable a scalable object storage system with application improved/optimized APIs, as well as access patterns that can offload or streamline application tasks. Doing so can improve application performance and scalability, while requiring/consuming fewer resources. The object storage application interfaces (APIs) can, for example, provide transaction semantics, application specific data storage or access abstractions, programmable storage side functionality, and/or asynchronous notification mechanisms.

Various file or object storage systems provide standard interfaces to open, close, read and/or write to files, while in object storage 'put' and 'get' operations can be used to store or read objects. Accordingly, when writing to a set of objects, order and/or consistency is not guaranteed, as some operations pertaining to the referenced objects may pass, others may fail, and/or objects may be updated out of order.

It can be appreciated that various applications may request/need to update multiple objects, e.g., within a single transaction. Additionally, in certain scenarios such applications may request/need to read data, perform one or more operations/manipulations on such data, and then write back the data (e.g., as manipulated). It can be appreciated that doing so can entail considerable processing overhead and increase latency with respect to the application. In light of various improvements to storage technologies, certain storage mediums (e.g., solid state disks (SSD)) can perform considerably faster than a networking stack. Accordingly, it can be advantageous to move various read-modify-write transactions to the storage backend and/or to create application specific data layouts (where, for example, application aware improvements/optimizations, such as with respect to accessing, caching and/or placing data can be made). The present embodiments may thus use more deterministic logic in certain implementations, while also implementing transactions on the storage side objects. In doing so, files may be manipulated without locks while preserving/ensuring data consistency.

It can be appreciated that implementing a storage device that ensures transaction semantics can be challenging, particularly over a scale-out infrastructure (because, for example, semantics, order, and state may need to be synchronized across multiple interconnected nodes which form a logical (clustered) object storage system). In certain implementations, one approach to addressing such a challenge may be to distribute the logic efficiently where objects may be scattered over multiple nodes, such that each object is present on a single node or duplicated over several nodes. Another approach is to place related objects within close proximity to one another, and/or to efficiently divide cross object logic between the client side software library and the object storage system.

Various additional features and/or functionalities may also be incorporated/integrated within the described technologies, examples of which include but are not limited to:

In certain implementations, attributes can be added within the read or write (or put or get etc.) operations. Such attributes can correspond to, reflect, and/or otherwise provide optimization information/instructions such as preferred data placement (e.g., in cache, fast tier, capacity tier, slow tier, or any other storage tier, etc.), an amount or priority of data caching, and/or a read-ahead window (e.g., to pre-fetch data ahead of time, such that subsequent reads can read data directly from cache memory). In doing so, deterministic control can be exercised over operations and/or functionality that may otherwise operate suboptimally.

Additionally, in certain implementations various transaction semantics, identifiers, etc., can be added to I/O operations. In doing so, multiple operations can be marked and/or identified as being part of a single transaction and the performance of such operations can be conducted in a defined sequence (e.g., as dictated by the transaction). Additionally, the various operations can thereby be performed as a whole, such that the transactions may either all commit or all fail, e.g., in an atomic manner such as may be consistent with ACID (atomicity, consistency, isolation, durability) properties.

Moreover, in certain implementations various improved data layouts can be provided (which may be configured or designed with respect to specific application(s)), together/in conjunction with APIs which allow/enable access to portions of an object or file (e.g., based on record identifiers, time/date information, and/or any other such identifier which can correspond to portions or ranges of data within a given object or file). For example, a file can be subdivided into an header and one or more data records, and a corresponding API can allow/enable access to the file as a whole, while also allowing/enabling reading and/or updating of specific records within the file, such as based on their index or index range (e.g., even without knowing the offset of such records in advance). The referenced data layout can improve efficiency by precluding the need for multiple read/write operations in order to find the location of the referenced records, update them, and/or to move data in the file (e.g., if the record size changes), while also eliminating the need to lock the file object from access by other applications or clients.

In certain implementations, various aspects of the data can be summarized, such as while writing such data within the system. For example, when an application attempts to write data to a given object, the described technologies can process/analyze the referenced object, e.g., in order to determine that portion(s) of the data to be written are redundant (e.g., such portions are already stored within the object). Upon determining that such portion(s) are redundant, the identified portions of the data to be written can be extracted/removed and only the meaningful (e.g., non-redundant) portion(s) of the data may be written into the object. For example, such a technique can be employed in a scenario in which data to be written includes information that is appended to file(s)/object(s) that have been previously stored. The described technologies can identify/mark the previously stored data (e.g., with a count greater by 1, reflecting that this record data appears multiple times) instead of adding such previously stored data to the file/object.

Additionally, in certain implementations, data filtering can be performed in conjunction with one or more read operations. For example, a request one or more objects can be received and such request can define or specify various data filtering criteria/rules. In response to such a request, the described technologies may return, for example, only the portion of the objects and/or data which match the filter criteria (in lieu of the entire object(s), for example). In doing so, considerable efficiencies can be achieved, e.g., with respect to network bandwidth and processing overhead (e.g., on the client side).

Moreover, in certain implementations the described technologies can tag data that is received/stored in various ways.

For example, when data is written to an object, the described technologies can process/inspect the associated operation metadata and/or the content of the object, and based on such metadata/content, the object and/or parts thereof can be marked or otherwise associated with various tags. Such tags can, for example, enable/enhance identification of the object in subsequent operations and/or can update system counters, such as with respect to data and/or content related statistics.

In certain implementations the described technologies may enrich data, such as by adding fields and/or content, e.g., based on reference(s) to current fields. In doing so, further data processing (e.g., by certain applications) can be achieved more efficiently, because, for example, it may no longer be necessary to explicitly look up the extra content (e.g., the content being referenced) during data processing operations. In some scenarios certain data fields may be explicitly replaced, e.g., for data and/or user anonymization and/or in order to substitute more relevant content.

Additionally, in certain implementations various procedures, operations, etc., can be stored in conjunction with the data/objects to which such procedures/operations pertain. For example, a user may invoke certain procedures on/with respect to one or more objects while optionally providing certain parameters, and the described technologies can run various pre-defined procedures on such objects which, for example, may read the object, modify some content of the object, write it back to the object, update the object metadata, update other stored objects, update various system counters or registers, and/or redirect the data to other systems. Performing such operations/processing closer to the data itself can minimize the network traffic, avoid the long latency associated with multiple IO roundtrips, and can reduce or eliminate the need to lock the data during the transaction.

Moreover, in certain implementations the described technologies can generate and/or provide various virtual objects. Such objects can, for example, trigger certain function(s), such as on read or write (or put or get) operations, such as functions to store or retrieve calculated/derived data. For example, when reading a log file, the described technologies can be configured to return specific log entries (e.g., only the most recent log entry or entries) instead of the entire log file. By way of further example, in lieu of separately storing content that is actually derived from another file, instead a virtual file can be generated and/or provided which represents such derivative content. When, for example, a read operation is received with respect to such derivative content, the derivative content can be calculated/generated based on the content from which it is derived. In doing so, considerable storage efficiency can be achieved.

In certain implementations, various group operations can be provided. Such operations can, for example, enable the described technologies to retrieve multiple objects having certain common attribute(s) and/or content. Additionally, the referenced group operations can enable certain manipulations to be performed with respect to the metadata and/or content of some or all of the objects determined to match one or more criteria.

Figure 3:
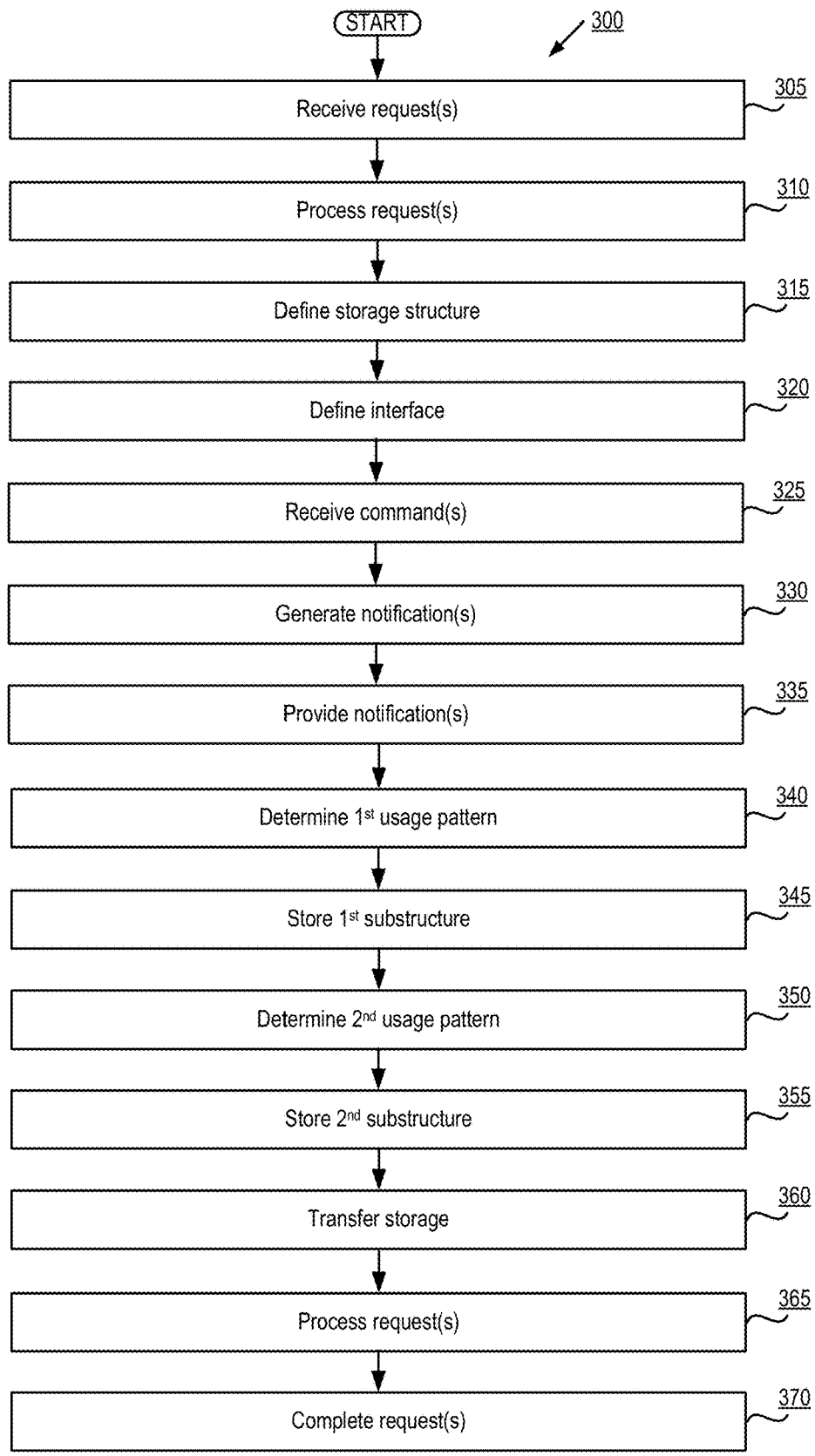
FIG. 3 depicts a flow diagram of aspects of a method for application-centric object storage in accordance with one implementation of the present disclosure.

FIG. 3 depicts a flow diagram of aspects of a method 300 for application-centric object storage. In certain implementations method 300 can pertain to application-centric object interfaces, such as are described herein. The method is performed by processing logic that may comprise hardware (circuitry, dedicated logic, etc.), software (such as is run on a computing device such as those described herein), or a combination of both. In one implementation, the method is performed by one or more elements depicted and/or described in relation to FIG. 1, while in some other implementations, one or more blocks of FIG. 3 may be performed by another machine or machines.

For simplicity of explanation, the various methods described herein are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 305, one or more requests can be received, such as with respect to a data object. In certain implementations, such requests can be received from a first application. For example, in certain implementations such request can include requests to read, write, modify, etc. such a data object, such as is described in detail herein. It should be understood that, in certain implementations, the referenced data object can pertain to a single data object (such as is referenced herein), while in other implementations the referenced data object can include and/or otherwise pertain to multiple data objects (e.g., a combination, composite, etc., of the referenced data objects). By way of illustration, in certain implementations the referenced data object can include a database table, a directory of files, etc. In certain implementations, various aspects of block 305 can be performed by server 120 (e.g., in conjunction with API 106, ODS 112 and/or storage resources 122), while in other implementations such aspects may be performed by one or more other elements/components, such as those described herein.

At block 310, the one or more requests (such as those received at 305) can be processed. In doing so, one or more substructures of the data object (e.g., the data object with respect to which the requests were received) can be identified. In certain implementations, various aspects of block 310 can be performed by server 120 (e.g., in conjunction with API 106, ODS 112 and/or storage resources 122), while in other implementations such aspects may be performed by one or more other elements/components, such as those described herein.

In certain implementations, the referenced requests can be processed, such as in order to determine various usage patterns of an application (e.g., the application from which the requests were received), such as with respect to the data object, e.g., in a manner described in detail herein. Moreover, in certain implementations various substructures of the data object can be identified based on the identified/determined usage patterns of the application with respect to the data object. For example, as described herein, the manner in which an application accesses a data object can indicate that only certain parts of such data object (e.g., relatively recent portions) are accessed by the application, while other portions are accessed infrequently (or never) by the application. Additionally, in certain implementations the referenced requests can be processed to identify various substructures of the data object that are accessed by the referenced requests independently of one or more other substructures of the data object. For example, as described herein, when one portion of the data object (e.g., the most recently written portion) is accessed while other portions are not, such can indicate that the respective portions can be stored as independent substructures, such as in a manner described herein). It should also be understood that, in certain implementations, the data object itself can be processed in order to identify the various substructures of the data object (e.g., the structure of a file, object, etc., can reflect various substructures that can be stored independent of one another).

At block 315, a storage structure for the data object can be defined. In certain implementations, such a storage structure can be defined based on/in view of an identification of the various substructures of the data object (e.g., as identified at 310). In certain implementations, the referenced storage structure can include a storage structure than enables independent access to the various substructures, such as is described herein. In certain implementations, various aspects of block 315 can be performed by server 120 (e.g., in conjunction with API 106, ODS 112 and/or storage resources 122), while in other implementations such aspects may be performed by one or more other elements/components, such as those described herein.

At block 320, an interface can be defined. In certain implementations, such an interface can be one through which the first application (e.g., the application from which the requests were received) can provide data access commands to the data object (e.g., the data object as stored in the storage structure as defined at 315), such as in a manner described herein. As described in detail herein, in certain implementations various parameters can be added to the referenced requests. Such parameters can, for example, identify and/or reference various substructures (e.g., those substructures with respect to which a particular request, command, etc., pertains. Moreover, in certain implementations one or more interface(s) can be defined, such as interfaces through which the first application (e.g., the application from which the requests were received) can provide data access commands to (and/or such data access commands can be received by) a data object, such as the data object as stored in a defined storage structure (such as the storage structure defined at 315). In certain implementations, various aspects of block 320 can be performed by server 120 (e.g., in conjunction with API 106, ODS 112 and/or storage resources 122), while in other implementations such aspects may be performed by one or more other elements/components, such as those described herein.

At block 325, at least one command, such as a data access command, can be received. In certain implementations, such command(s) can be received with respect to at least one of the one or more substructures of the data object (e.g., those substructures identified at 310). Moreover, in certain implementations the referenced data access command(s) can include (but are not limited to): a data creation command (such as may be directed to at least one of the one or more substructures of the data object), a data modification command (such as may be directed to at least one of the one or more substructures of the data object), a data deletion command (such as may be directed to at least one of the one or more substructures of the data object) and/or various other commands such as those that are described and/or referenced herein. In certain implementations, various aspects of block 325 can be performed by server 120 (e.g., in conjunction with API 106, ODS 112 and/or storage resources 122), while in other implementations such aspects may be performed by one or more other elements/components, such as those described herein.

At block 330, one or more notifications can be generated, such as in a manner described herein. In certain implementations, such notifications can correspond to one or more commands (e.g., data access commands, such as those received at 325). Moreover, in certain implementations the referenced notifications can be generated in response to receipt of one or more commands (e.g., data access command(s)). Additionally, in certain implementations the referenced notifications can be generated in response to execution of various commands (e.g., data access commands), such as with respect to various substructures of the data object (e.g., the substructure(s) with respect to which the command(s) were received, e.g., at 325). In certain implementations, various aspects of block 330 can be performed by server 120 (e.g., in conjunction with API 106, ODS 112 and/or storage resources 122), while in other implementations such aspects may be performed by one or more other elements/components, such as those described herein.

At block 335, one or more notifications (such as those generated at 330) can be provided, such as in a manner described herein. In certain implementations, such notifications can be provided to a first application (e.g., the application from which the requests were received, e.g., at 305). In other implementations, the referenced notifications can be provided to another application (e.g., an application that is different than the application from which the requests were received, e.g., at 305). In certain implementations, various aspects of block 335 can be performed by server 120 (e.g., in conjunction with API 106, ODS 112 and/or storage resources 122), while in other implementations such aspects may be performed by one or more other elements/components, such as those described herein.

At block 340, a first usage pattern can be determined, such as with respect to a first substructure of the data object. For example, having defined a storage structure for a data object which reflects the identification of various substructures within the data object, the manner in which various applications utilize such substructures can be observed, processed, and/or analyzed. For example, such interactions can be analyzed to determine the various types of operations that are performed with respect to various substructures. In certain implementations, various aspects of block 340 can be performed by server 120 (e.g., in conjunction with API 106, ODS 112 and/or storage resources 122), while in other implementations such aspects may be performed by one or more other elements/components, such as those described herein.

At block 345, the first substructure of the data object can be stored. In certain implementations, such a substructure can be stored on a first storage resource 122 (e.g., SSD, cloud storage, and/or any other such storage medium, including but not limited to those described and/or referenced herein). Moreover, in certain implementations such a substructure can be stored on a particular storage resource based on the usage pattern (e.g., as determined at 345). For example, based on the manner in which such a substructure can be determined to be utilized (e.g., the particular types of operations, applications, etc., that are performed on such a substructure), a storage medium that improves and/or optimizes the performance of such operation(s) and/or applications(s) can be selected, such as in a manner described herein. In certain implementations, various aspects of block 345 can be performed by server 120 (e.g., in conjunction with API 106, ODS 112 and/or storage resources 122), while in other implementations such aspects may be performed by one or more other elements/components, such as those described herein.

At block 350, a second usage pattern can be determined, such as with respect to a second substructure of the data object (which may, for example, be different that the substructure referenced above, e.g., at 340). For example, having defined a storage structure for a data object which reflects the identification of various substructures within the data object, the manner in which various applications utilize such substructures can be observed, processed, and/or analyzed. For example, such interactions can be analyzed to determine the various types of operations that are performed with respect to various substructures, such as in a manner described herein. Moreover, in certain implementations a second usage pattern can be determined with respect to the first substructure of the data object (e.g., the substructure referenced above, e.g., at 340 and 345). In certain implementations, various aspects of block 350 can be performed by server 120 (e.g., in conjunction with API 106, ODS 112 and/or storage resources 122), while in other implementations such aspects may be performed by one or more other elements/components, such as those described herein.

At block 355, the second substructure of the data object can be stored. In certain implementations, such a substructure can be stored on a second storage resource 122 (e.g., SSD, cloud storage, and/or any other such storage medium, including but not limited to those described and/or referenced herein) (it should be understood that the referenced storage resource may, for example, be different that the storage resource referenced above, e.g., at 345). Moreover, in certain implementations such a substructure can be stored on a particular storage resource based on the usage pattern (e.g., as determined at 350). For example, based on the manner in which such a substructure can be determined to be utilized (e.g., the particular types of operations, applications, etc., that are performed on such a substructure), a storage medium that improves and/or optimizes the performance of such operation(s) and/or applications(s) can be selected, such as in a manner described herein. In certain implementations, various aspects of block 355 can be performed by server 120 (e.g., in conjunction with API 106, ODS 112 and/or storage resources 122), while in other implementations such aspects may be performed by one or more other elements/components, such as those described herein.

At block 360, storage of a substructure of the data object (e.g., the first substructure, such as that stored at 345) can be transferred, such as in a manner described herein. In certain implementations, storage of such a substructure can be transferred from a first storage resource to a second storage resource (e.g., a storage resource that is different from the first storage resource). Moreover, in certain implementations the referenced first storage resource can include various storage resource(s) associated with a first storage tier and the referenced second storage resource can include various storage resource(s) associated with a second storage tier, such as is described herein. Additionally, in certain implementations the storage of such a substructure can be transferred based on a usage pattern such as a second usage pattern (e.g., the second usage pattern determined at block 350). In certain implementations, various aspects of block 360 can be performed by server 120 (e.g., in conjunction with API 106, ODS 112 and/or storage resources 122), while in other implementations such aspects may be performed by one or more other elements/components, such as those described herein.

At block 365, the one or more requests can be processed, such as in order to determine which of a first index or a second index to utilize in completing the request, such as in a manner described herein (and substantially in the manner described in detail below at 425). In certain implementations, the first index can be generated with respect to the data object as represented in a first format (e.g., a database format) and the second index can generated with respect to the data object as accessed in a second format (e.g., a streaming content format). In certain implementations the requests can include a request that pertains to the second format. Moreover, in certain implementations the application (from which the referenced requests were received) can be factored in/accounted for in determining which index to utilize in completing the request. For example, if a request is received that is formatted/configured with respect to database tables, etc., a corresponding index (which accesses data in a comparable manner) can be utilized (in lieu of another index which may access such data as a stream, for example). In certain implementations, various aspects of block 365 can be performed by server 120 (e.g., in conjunction with API 106, ODS 112 and/or storage resources 122), while in other implementations such aspects may be performed by one or more other elements/components, such as those described herein.

At block 370, the one or more requests can be completed, e.g., via the first index or the second index (in a substantially comparable manner to that described below at 430). In certain implementations, such requests can be completed by generating a virtual data object, such as is described herein. As described herein, such a virtual data object can include, for example, an object identifier (e.g., a filename, etc.), one or more pointers (e.g., to various elements of the data object) and/or one or more parameters that pertain to one or more elements of the data object (e.g., a timestamp range, etc., as is described herein). Moreover, in certain implementations the referenced virtual data object can include an object identifier and one or more elements of the data object. Additionally, in certain implementations the referenced virtual data object can include an object identifier, one or more pointers to one or more elements of the data object, and one or more pointers to one or more elements of another data object. In yet other implementations the referenced virtual data object can include an object identifier, one or more parameters that pertain to one or more elements of the data object, and one or more parameters that pertain to one or more elements of another data object. In yet other implementations the referenced virtual data object can include an object identifier, one or more elements of the data object, and one or more elements of another data object. In yet other implementations the referenced virtual data object can include an object identifier, the data object, and another data object. In certain implementations, various aspects of block 370 can be performed by server 120 (e.g., in conjunction with API 106, ODS 112 and/or storage resources 122), while in other implementations such aspects may be performed by one or more other elements/components, such as those described herein.

Figure 4:
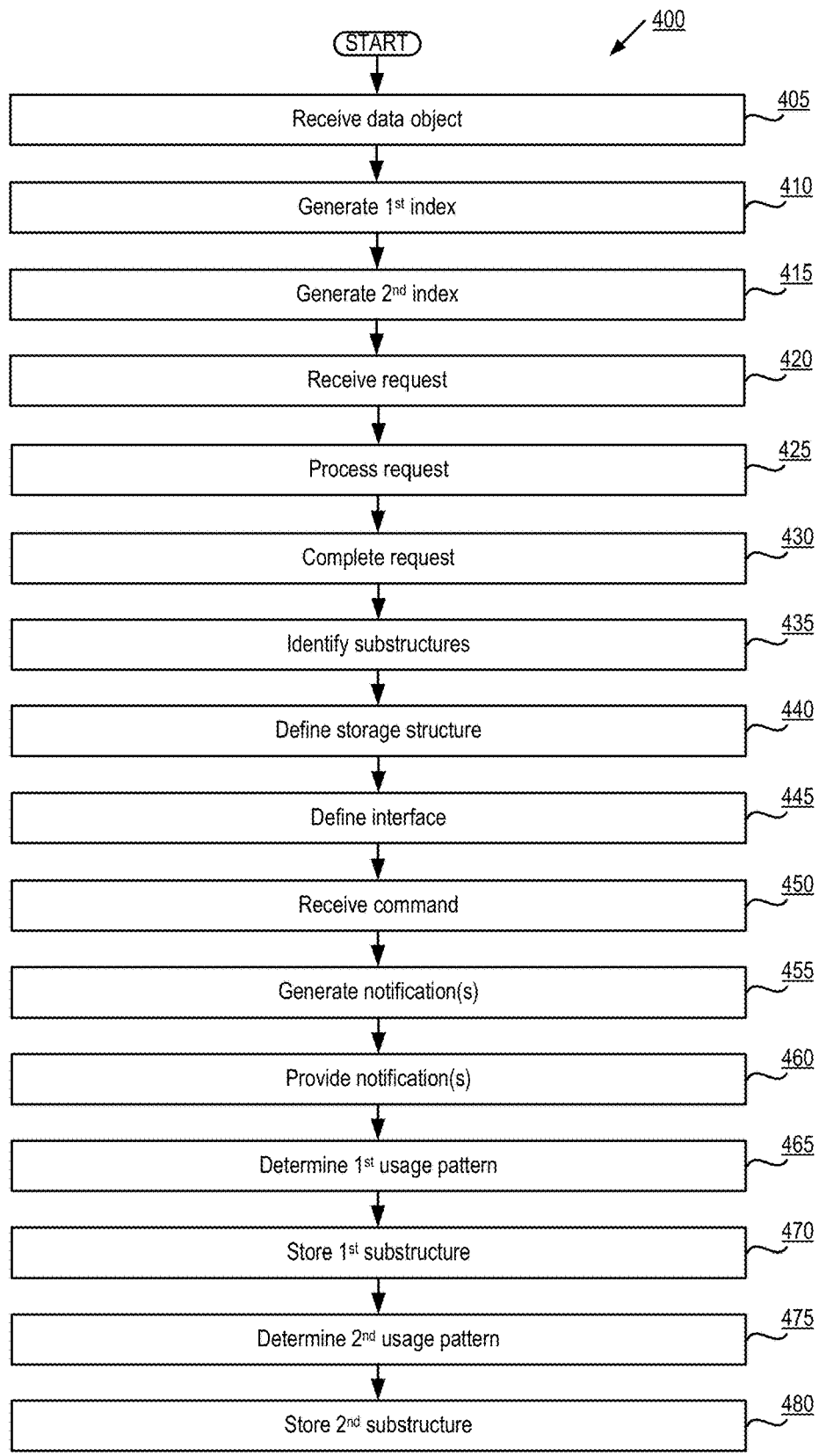
FIG. 4 depicts a flow diagram of aspects of a method for application-centric object storage in accordance with one implementation of the present disclosure.

FIG. 4 depicts a flow diagram of aspects of a further method 400 for application-centric object storage. In certain implementations method 400 can pertain to managing object requests via multiple indexes, such as is described herein. The method is performed by processing logic that may comprise hardware (circuitry, dedicated logic, etc.), software (such as is run on a computing device such as those described herein), or a combination of both. In one implementation, the method is performed by one or more elements depicted and/or described in relation to FIG. 1, while in some other implementations, one or more blocks of FIG. 4 may be performed by another machine or machines.

At block 405, a data object (e.g., a first data object, such as is described/referenced herein) can be received. In certain implementations, such a data object can be in a first format. Examples of such a data object include but are not limited to a file, a stream, a database, and/or any other such type of data described and/or referenced herein. In certain implementations, various aspects of block 405 can be performed by server 120 (e.g., in conjunction with API 106, ODS 112 and/or storage resources 122), while in other implementations such aspects may be performed by one or more other elements/components, such as those described herein.

At block 410, a first index can be generated. In certain implementations, such an index can be generated with respect to the data object (e.g., the data object received at block 405). In certain implementations, such an index can, for example, be an index that reflects, corresponds, and/or is otherwise associated with the native format of the data object while in other implementations the referenced index may not correspond to such format. In certain implementations, various aspects of block 410 can be performed by server 120 (e.g., in conjunction with API 106, ODS 112 and/or storage resources 122), while in other implementations such aspects may be performed by one or more other elements/components, such as those described herein.

At block 415, a second index can be generated. In certain implementations, such a second index can be generated with respect to the data object (e.g., the data object received at block 405). In certain implementations, such an index can be one through which the data object can be accessed in a second format, such as in a manner described herein. For example, a data object can be initially received as a stream and an index can be generated such that the data object can be accessed/viewed as a database table. In other implementations, such an index may not necessarily pertain to the referenced second format. In certain implementations, various aspects of block 415 can be performed by server 120 (e.g., in conjunction with API 106, ODS 112 and/or storage resources 122), while in other implementations such aspects may be performed by one or more other elements/components, such as those described herein.

At block 420, a request can be received with respect to the data object (e.g., the data object received at block 405). In certain implementations, such a request can include a request that pertains to the second format (e.g., a format in which the data object was not initially received). In certain implementations, such a request can be received from an application. Moreover, in certain implementations the data object can be received from one application (e.g., an application that provides streaming content) while the referenced request can be received from another application (e.g., an analytics application that processes database tables). In other implementations, the data object and the request can be received from the same application. Additionally, in certain implementations, various aspects of block 420 can be performed by server 120 (e.g., in conjunction with API 106, ODS 112 and/or storage resources 122), while in other implementations such aspects may be performed by one or more other elements/components, such as those described herein.

At block 425, the request can be processed, such as in order to determine which of the first index or the second index to utilize in completing the request, such as in a manner described herein. Moreover, in certain implementations the application (from which the referenced request was received) can be factored in/accounted for in determining which index to utilize in completing the request. For example, if a request is received that is formatted/configured with respect to database tables, etc., a corresponding index (which accesses data in a comparable manner) can be utilized (in lieu of another index which may access such data as a stream, for example). In certain implementations, various aspects of block 425 can be performed by server 120 (e.g., in conjunction with API 106, ODS 112 and/or storage resources 122), while in other implementations such aspects may be performed by one or more other elements/components, such as those described herein.

At block 430, the request can be completed, e.g., via the first index or the second index. In certain implementations, such a request can be completed by generating a virtual data object, such as is described herein. Such a virtual data object can include, for example, an object identifier (e.g., a filename and/or any other such identifier), one or more pointers (e.g., to various elements of the first data object), one or more pointers to one or more elements of a second data object (e.g., other than the first data object), one or more parameters that pertain to one or more elements of the data object (e.g., a timestamp range, etc., as is described herein), one or more parameters that pertain to one or more elements of one or more other data objects (e.g., other than the first data object), one or more elements of the first data object, one or more elements of one or more other data object(s) (e.g., other than the first data object), the first data object and/or one or more other data object(s). In certain implementations, various aspects of block 430 can be performed by server 120 (e.g., in conjunction with API 106, ODS 112 and/or storage resources 122), while in other implementations such aspects may be performed by one or more other elements/components, such as those described herein.

At block 435, one or more substructures of the data object can be identified (e.g., substantially in the manner described above at 310). In certain implementations, various aspects of block 445 can be performed by server 120 (e.g., in conjunction with API 106, ODS 112 and/or storage resources 122), while in other implementations such aspects may be performed by one or more other elements/components, such as those described herein.

Moreover, in certain implementations the referenced request can be processed to determine various usage patterns of an application (e.g., the application from which the request were received), such as with respect to the data object, e.g., in a manner described in detail herein. Moreover, in certain implementations various substructures of the data object can be identified based on the identified/determined usage patterns of the application with respect to the data object. For example, as described herein, the manner in which an application accesses a data object can indicate that only certain parts of such data object (e.g., relatively recent portions) are accessed by the application, while other portions are accessed infrequently (or never) by the application. Additionally, in certain implementations the referenced request can be processed to identify various substructures of the data object that are accessed by the referenced requests independently of one or more other substructures of the data object. For example, as described herein, when one portion of the data object (e.g., the most recently written portion) is accessed while other portions are not, such can indicate that the respective portions can be stored as independent substructures, such as in a manner described herein). It should also be understood that, in certain implementations, the data object itself can be processed in order to identify the various substructures of the data object (e.g., the structure of a file, object, etc., can reflect various substructures that can be stored independent of one another).

At block 440, a storage structure for the data object can be defined. In certain implementations, such a storage structure can be defined based on/in view of an identification of the various substructures of the data object (e.g., as identified at 435). In certain implementations, the referenced storage structure can include a storage structure than enables independent access to the various substructures, such as is described herein. In certain implementations, various aspects of block 440 can be performed by server 120 (e.g., in conjunction with API 106, ODS 112 and/or storage resources 122), while in other implementations such aspects may be performed by one or more other elements/components, such as those described herein.

At block 445, an interface can be defined. In certain implementations, such an interface can be one through which the first application (e.g., the application from which the request was received) can provide data access commands to the data object (e.g., the data object as stored in the storage structure as defined at 440), such as in a manner described herein. In certain implementations, multiple interfaces can be defined. Such interfaces can be configured such that the first application can provide (e.g., via the respective interfaces) various data access commands to the first data object, such as stored in the defined storage structure. As described in detail herein, in certain implementations various parameters can be added to the referenced requests. Such parameters can, for example, identify and/or reference various substructures (e.g., those substructures with respect to which a particular request, command, etc., pertains. In certain implementations, various aspects of block 445 can be performed by server 120 (e.g., in conjunction with API 106, ODS 112 and/or storage resources 122), while in other implementations such aspects may be performed by one or more other elements/components, such as those described herein.

At block 450, at least one command, such as a data access command, can be received. In certain implementations, such command(s) can be received with respect to at least one of the one or more substructures of the first data object (e.g., those substructures identified at 435). Moreover, in certain implementations the referenced data access command(s) can include (but are not limited to): a data creation command (such as may be directed to at least one of the one or more substructures of the first data object), a data modification command (such as may be directed to at least one of the one or more substructures of the first data object), a data deletion command (such as may be directed to at least one of the one or more substructures of the first data object) and/or various other commands such as those that are described and/or referenced herein. In certain implementations, various aspects of block 450 can be performed by server 120 (e.g., in conjunction with API 106, ODS 112 and/or storage resources 122), while in other implementations such aspects may be performed by one or more other elements/components, such as those described herein.

At block 455, one or more notifications can be generated, such as in a manner described herein. In certain implementations, such notifications can correspond to one or more commands (e.g., data access commands, such as those received at 450). Moreover, in certain implementations the referenced notifications can be generated in response to receipt of one or more commands (e.g., data access command(s)). Additionally, in certain implementations the referenced notifications can be generated in response to execution of various commands (e.g., data access commands), such as with respect to various substructures of the first data object (e.g., the substructure(s) with respect to which the command(s) were received, e.g., at 450). In certain implementations, various aspects of block 455 can be performed by server 120 (e.g., in conjunction with API 106, ODS 112 and/or storage resources 122), while in other implementations such aspects may be performed by one or more other elements/components, such as those described herein At block 460, one or more notifications (such as those generated at 460) can be provided, such as in a manner described herein. In certain implementations, such notifications can be provided to a first application (e.g., the application from which the requests were received, e.g., at 420). In other implementations, the referenced notifications can be provided to another application (e.g., an application that is different than the application from which the requests were received, e.g., at 420). In certain implementations, various aspects of block 460 can be performed by server 120 (e.g., in conjunction with API 106, ODS 112 and/or storage resources 122), while in other implementations such aspects may be performed by one or more other elements/components, such as those described herein.

At block 465, a first usage pattern can be determined, such as with respect to a first substructure of the data object. For example, having defined a storage structure for a data object which reflects the identification of various substructures within the data object, the manner in which various applications utilize such substructures can be observed, processed, and/or analyzed. For example, such interactions can be analyzed to determine the various types of operations that are performed with respect to various substructures. In certain implementations, various aspects of block 465 can be performed by server 120 (e.g., in conjunction with API 106, ODS 112 and/or storage resources 122), while in other implementations such aspects may be performed by one or more other elements/components, such as those described herein.

At block 470, the first substructure of the data object can be stored. In certain implementations, such a substructure can be stored on a first storage resource 122 (e.g., SSD, cloud storage, and/or any other such storage medium, including but not limited to those described and/or referenced herein). Moreover, in certain implementations such a substructure can be stored on a particular storage resource based on the usage pattern (e.g., as determined at 465). For example, based on the manner in which such a substructure can be determined to be utilized (e.g., the particular types of operations, applications, etc., that are performed on such a substructure), a storage medium that improves and/or optimizes the performance of such operation(s) and/or applications(s) can be selected, such as in a manner described herein. In certain implementations, various aspects of block 465 can be performed by server 120 (e.g., in conjunction with API 106, ODS 112 and/or storage resources 122), while in other implementations such aspects may be performed by one or more other elements/components, such as those described herein.

At block 475, a second usage pattern can be determined, such as with respect to a second substructure of the data object (which may, for example, be different that the substructure referenced above, e.g., at 470). For example, having defined a storage structure for a data object which reflects the identification of various substructures within the data object, the manner in which various applications utilize such substructures can be observed, processed, and/or analyzed. For example, such interactions can be analyzed to determine the various types of operations that are performed with respect to various substructures. In certain implementations, various aspects of block 475 can be performed by server 120 (e.g., in conjunction with API 106, ODS 112 and/or storage resources 122), while in other implementations such aspects may be performed by one or more other elements/components, such as those described herein.

At block 480, the second substructure of the data object can be stored. In certain implementations, such a substructure can be stored on a second storage resource 122 (e.g., SSD, cloud storage, and/or any other such storage medium, including but not limited to those described and/or referenced herein) (it should be understood that the referenced storage resource may, for example, be different that the storage resource referenced above, e.g., at 470). Moreover, in certain implementations such a substructure can be stored on a particular storage resource based on the usage pattern (e.g., as determined at 475). For example, based on the manner in which such a substructure can be determined to be utilized (e.g., the particular types of operations, applications, etc., that are performed on such a substructure), a storage medium that improves and/or optimizes the performance of such operation(s) and/or applications(s) can be selected, such as in a manner described herein. In certain implementations, various aspects of block 480 can be performed by server 120 (e.g., in conjunction with API 106, ODS 112 and/or storage resources 122), while in other implementations such aspects may be performed by one or more other elements/components, such as those described herein.

Figure 5:
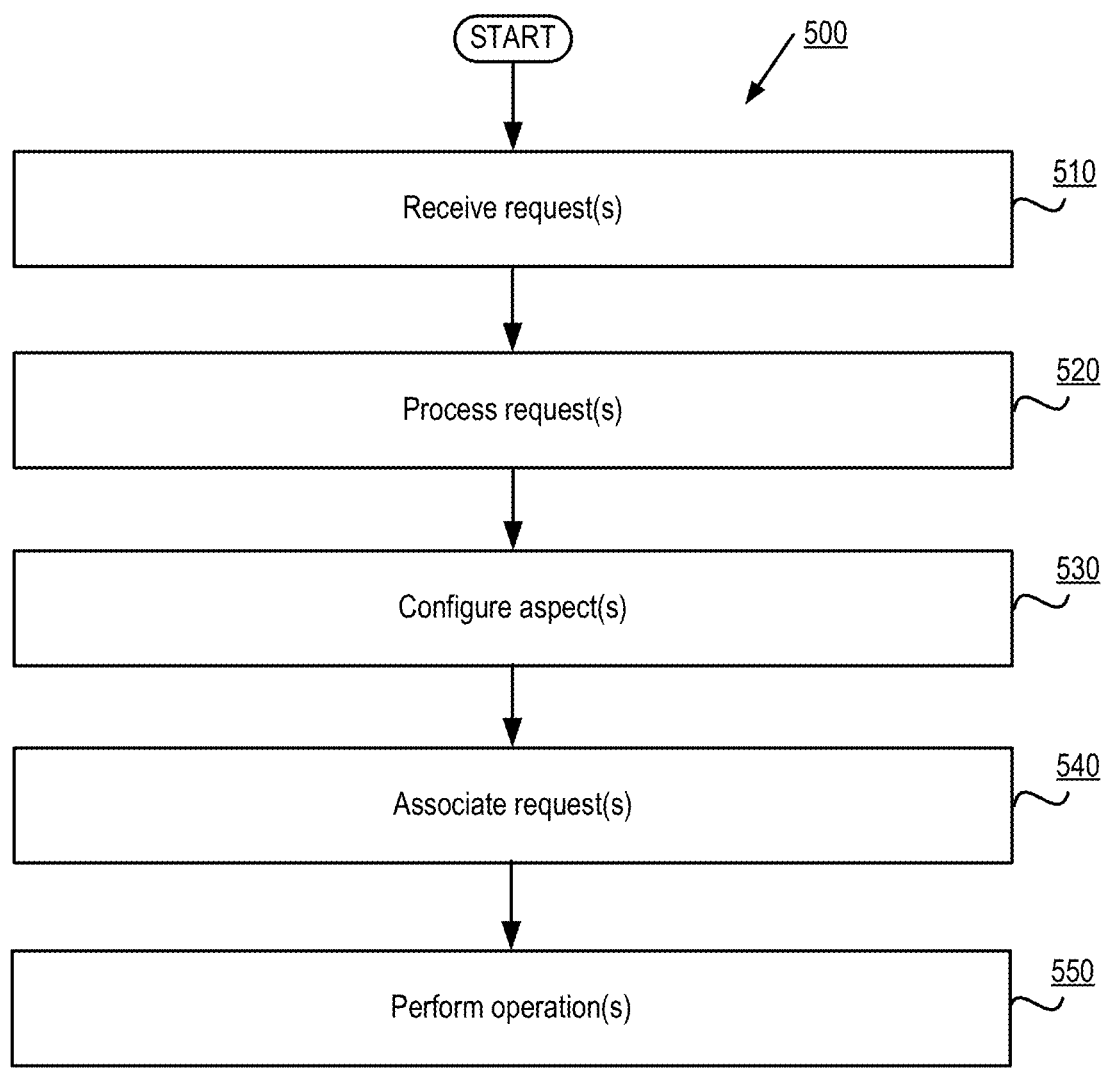
FIG. 5 depicts a flow diagram of aspects of a method for application-centric object storage in accordance with one implementation of the present disclosure.

FIG. 5 depicts a flow diagram of aspects of a further method 500 for application-centric object storage. In certain implementations method 500 can pertain to application-centric object configuration, such as is described herein. The method is performed by processing logic that may comprise hardware (circuitry, dedicated logic, etc.), software (such as is run on a computing device such as those described herein), or a combination of both. In one implementation, the method is performed by one or more elements depicted and/or described in relation to FIG. 1, while in some other implementations, one or more blocks of FIG. 5 may be performed by another machine or machines.

At block 510, one or more requests can be received, such as in a manner described herein. In certain implementations, such requests can be received from an application. Moreover, in certain implementations such requests can be received with respect to (and/or can otherwise correspond to and/or be associated with) a data object, such as is described herein. In certain implementations, such a data object can include one or more data objects (e.g., a combined/composite data object). Moreover, in certain implementations the referenced request(s) can include one or more filtering rules. In certain implementations, various aspects of block 510 can be performed by server 120 (e.g., in conjunction with API 106, ODS 112 and/or storage resources 122), while in other implementations such aspects may be performed by one or more other elements/components, such as those described herein.

At block 520, one or more requests (such as those received at 510) can be processed. In doing so, one or more data utilization characteristics of the application (e.g., the application from which the request(s) were received, e.g., at 510) can be determined, such as with respect to the data object (e.g., in a manner described herein). Examples of the referenced utilization characteristics include, but are not limited to, the various usage pattern(s) described and/or referenced herein. In certain implementations, various aspects of block 520 can be performed by server 120 (e.g., in conjunction with API 106, ODS 112 and/or storage resources 122), while in other implementations such aspects may be performed by one or more other elements/components, such as those described herein.

At block 530, one or more aspects of the data object can be configured. In certain implementations, such aspect(s) can be configured based on/in view of one or more data utilization characteristics (e.g., as determined at 520). Moreover, in certain implementations various aspects of the storage of the data object can be configured. Additionally, in certain implementations one or more attributes can be added to the referenced request(s) (e.g., those received at 510). Such attributes can include, for example: a preferred data placement of one or more elements of the data object, an amount of data caching to be performed with respect to one or more elements of the data object, a priority of data caching to be performed with respect to one or more elements of the data object, and/or a read-ahead window to be applied with respect to one or more elements of the data object. In certain implementations, various aspects of block 530 can be performed by server 120 (e.g., in conjunction with API 106, ODS 112 and/or storage resources 122), while in other implementations such aspects may be performed by one or more other elements/components, such as those described herein.

Moreover, in certain implementations a storage tier can be selected, such as with respect to the data object. In certain implementations, such a storage tier (or storage tiers) can selected based on/in view of: a performance of the referenced storage tier, a speed of the storage tier, a capacity of the storage tier, a physical location of the storage tier, a geographical location of the storage tier, an access protocol associated with the storage tier, an availability of the storage tier, and/or one or more functional properties of the storage tier (e.g., encryption, compression, etc.).

In certain implementations, various aspects of the storage of one or more data objects can be configured. For example, one or more transaction semantics and/or one or more identifiers can be added to the one or more requests. Moreover, in certain implementations one or more aspects of the storage of at least one of the one or more data objects can be configured. Additionally, in certain implementations one or more transaction semantics and one or more identifiers can be added, e.g., to the one or more requests.

Moreover, in certain implementations one or more data layouts and/or or one or more APIs can be provided, e.g., with respect to the application. In certain implementations, the referenced data layouts and/or APIs can enable the application to access various elements of the data object, such as based on one or more identifiers. Such identifiers can include but are not limited to: one or more record identifiers and/or one or more chronological identifiers, such as are described herein. Moreover, in certain implementations the referenced data layouts and/or APIs can enable another application to access one or more elements of the data object.

Additionally, in certain implementations it can be determined that one or more elements of the data object are redundant (e.g., as described herein). In certain implementations, upon determining that such element(s) are redundant, such elements determined to be redundant can be extracted, e.g., from the data object and the remaining elements of the data object can be stored, such as in a manner described herein.

Moreover, in certain implementations one or more elements of the object can be marked, e.g., with one or more tags, such as in a manner described herein. In certain implementations, such tags can be generated, for example, based on/in view of an inspection of metadata, such as metadata associated with the referenced request(s) (e.g., those received at 510). Additionally, in certain implementations the referenced tag(s) can be generated based on/in view of an inspection of one or more elements of the data object.

In certain implementations, one or more elements can be added to the data object, such as in a manner described herein. Examples of such elements include but are not limited to one or more fields. For example, one or more fields can be added to the data object based on a reference in the data object to such one or more fields. Moreover, in certain implementations one or more stored procedures can be invoked with respect to the data object, such as in a manner described herein.

Additionally, in certain implementations one or more virtual objects can be provided with respect to the data object, such as in a manner described herein. Such virtual objects can, for example, enable the performance of the one or more requests with respect to an alternate format of the data object, such as is described herein.

Moreover, in certain implementations the referenced request(s) (e.g., those received at 510) can be performed with respect to multiple data objects, such as those that share one or more attributes with the data object.

In certain implementations, one or more first elements of the data object can be stored. In certain implementations, such first elements can be stored in a first storage resource, such as is described herein. In certain implementations the referenced first elements of the data object can be stored in a first storage resource based on: a size of the one or more first elements of the data object, an access frequency of the one or more first elements of the data object, an age of the one or more first elements of the data object, a policy associated with the one or more first elements of the data object, a schedule associated with the one or more first elements of the data object, and/or a write frequency associated with the one or more first elements of the data object. Moreover, in certain implementations one or more second elements of the data object can be stored in a second storage resource.

Additionally, in certain implementations one or more elements of the data object can be provided (e.g. in a manner described herein) in view of the one or more filtering rules (e.g., those received at 510).

At block 540, one or more requests (e.g., those received at 510) can be associated with one or more operations, such as in a manner described herein. In certain implementations, various aspects of block 540 can be performed by server 120 (e.g., in conjunction with API 106, ODS 112 and/or storage resources 122), while in other implementations such aspects may be performed by one or more other elements/components, such as those described herein.

At block 550, one or more of the referenced operations can be performed. In certain implementations, such operations can be performed in a sequence as dictated by at least one of the transaction semantics and/or API semantics, such as are described and/or referenced herein. In certain implementations, various aspects of block 550 can be performed by server 120 (e.g., in conjunction with API 106, ODS 112 and/or storage resources 122), while in other implementations such aspects may be performed by one or more other elements/components, such as those described herein.

Figure 6:
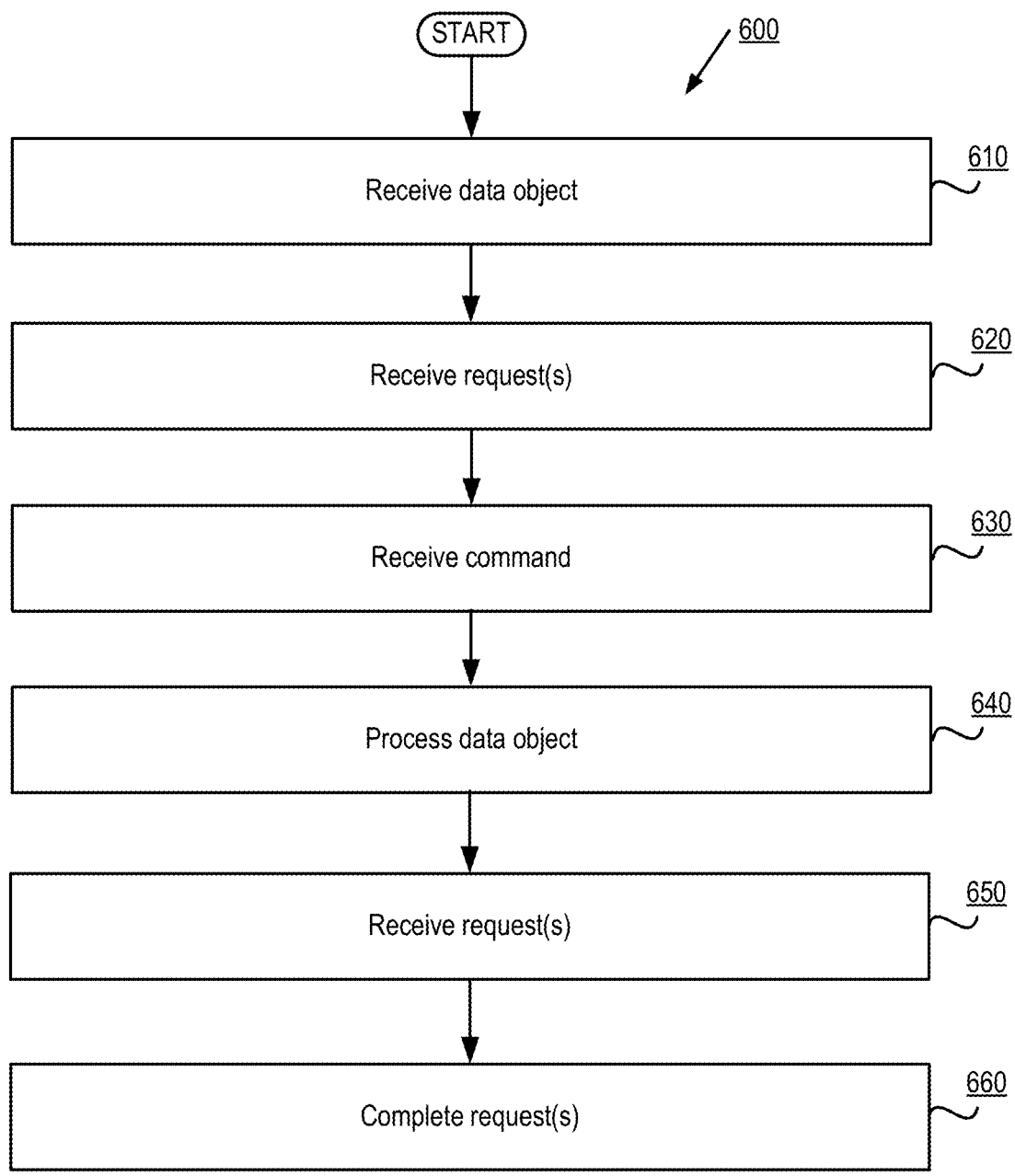
FIG. 6 depicts a flow diagram of aspects of a method for application-centric object storage in accordance with one implementation of the present disclosure.

FIG. 6 depicts a flow diagram of aspects of a further method 600 for application-centric object storage. In certain implementations method 600 can pertain to virtual data objects, such as is described herein. The method is performed by processing logic that may comprise hardware (circuitry, dedicated logic, etc.), software (such as is run on a computing device such as those described herein), or a combination of both. In one implementation, the method is performed by one or more elements depicted and/or described in relation to FIG. 1, while in some other implementations, one or more blocks of FIG. 6 may be performed by another machine or machines.

At block 610, a first data object can be received. In certain implementations, such a first data object can be in a first format, such as is described herein. In certain implementations, various aspects of block 610 can be performed by server 120 (e.g., in conjunction with API 106, ODS 112 and/or storage resources 122), while in other implementations such aspects may be performed by one or more other elements/components, such as those described herein.

At block 620, a request can be received. In certain implementations, such a request can be a request to access the first data object (e.g., as received at 610) in a second format (e.g., a format other than the format in which it was received, stored, previously accessed, etc.). In certain implementations, various aspects of block 620 can be performed by server 120 (e.g., in conjunction with API 106, ODS 112 and/or storage resources 122), while in other implementations such aspects may be performed by one or more other elements/components, such as those described herein.

At block 630, a command to initialize the first data object (e.g., as received at 610) in the second format can be received. In certain implementations, various aspects of block 630 can be performed by server 120 (e.g., in conjunction with API 106, ODS 112 and/or storage resources 122), while in other implementations such aspects may be performed by one or more other elements/components, such as those described herein.

At block 640, the first data object (e.g., a first data object in a first format) can be processed. In doing so, a virtual data object can be generated, such as in a manner described herein. In certain implementations, such a virtual data object can include and/or otherwise correspond to/reflect a representation of the first data object in a second format. Moreover, in certain implementations such a virtual data object can be generated based on/in response to receipt of the first data object in the first format (e.g., at block 610). Additionally, in certain implementations, the first data object in the first format can be processed based on receipt of the request to access the first data object in the second format (e.g., at block 620) to generate the virtual data object. Moreover, in certain implementations the first data object in the first format can be processed based on receipt of the command to initialize the first data object in the second format (e.g., at block 630), to generate the virtual data object. Additionally, in certain implementations the first data object in the first format can be processed to generate the virtual data object. In certain implementations, various aspects of block 640 can be performed by server 120 (e.g., in conjunction with API 106, ODS 112 and/or storage resources 122), while in other implementations such aspects may be performed by one or more other elements/components, such as those described herein.

As described in detail herein, the referenced virtual data object can include, for example, an object identifier (e.g., a filename, etc.), one or more pointers (e.g., to various elements of the first data object) and/or one or more parameters that pertain to one or more elements of the first data object (e.g., a timestamp range, etc., as is described herein). Moreover, in certain implementations the referenced virtual data object can include an object identifier and one or more elements of the first data object. Additionally, in certain implementations the referenced virtual data object can include an object identifier, one or more pointers to one or more elements of the first data object, and one or more pointers to one or more elements of other data object(s). In yet other implementations the referenced virtual data object can include an object identifier, one or more parameters that pertain to one or more elements of the first data object, and one or more parameters that pertain to one or more elements of other data object(s). In yet other implementations the referenced virtual data object can include an object identifier, one or more elements of the first data object, and one or more elements of other data object(s). In yet other implementations the referenced virtual data object can include an object identifier, the first data object, and another data object.

At block 650, a request with respect to the first data object can be received. In certain implementations, such a request can be received from an application, such as an application that is configured with respect to the second format, such as in a manner described herein. In certain implementations, various aspects of block 650 can be performed by server 120 (e.g., in conjunction with API 106, ODS 112 and/or storage resources 122), while in other implementations such aspects may be performed by one or more other elements/components, such as those described herein.

At block 660, the request (e.g., the request received at 650) can be completed. In certain implementations, such a request can be completed with respect to the first data object and the application via the virtual data object, such as in a manner described herein. In certain implementations, various aspects of block 660 can be performed by server 120 (e.g., in conjunction with API 106, ODS 112 and/or storage resources 122), while in other implementations such aspects may be performed by one or more other elements/components, such as those described herein.

By way of further illustration, as has been described, various operations described herein can be performed by/in conjunction with an interface which can be positioned between a data storage/management system and various applications which own and/or otherwise interact with the stored data and which can include functionality for providing storage and management of the data. The referenced applications (and/or groups or categories thereof) may have or otherwise be associated with different and/or unique data structures and/or usage patterns. For example, certain applications may be databases with multi-field entries, such that various individual entries may be the data entities which are used independently. If data from the application is stored in blocks in such a way that, for example, four database entries are stored together, all four database entries may need to be fetched and locked (e.g., for all users) and rewritten for every transaction request, three of them unnecessarily (e.g. in a scenario in which such a request actually pertains to only one entry). Accordingly, such an interface fails to account for the fact that the referenced data structure is actually based on particular database entries and that the usage pattern involves one entry per request.

Accordingly, such an interface can be modified (and/or a new interface can be defined) to handle, for example, the specific application and/or category of application more efficiently, e.g., in view of its data structure and/or usage pattern. For example, a parameter can be provided, e.g., to the read command, that requests a particular database entry. Another example is to add a parameter identifying a time or a relative position in a scenario in which the data includes video recordings (e.g., from a video camera) and/or other content streams.

Moreover, the referenced modification/definition of the referenced interface may include adding various specialized functions. For example, a log file application may be provided with a modified log file read command which looks only at a specific number of log entries (e.g., the most recent entries) instead of calling up an entire log file.

As a result, the described technologies enable various processing, caching, and transaction semantics to be moved closer to the data itself, and further distribute such operations more efficiently (e.g., over multiple data management nodes).

Moreover, the modification and/or definition of the referenced interface can include providing improved, enhanced, and/or smarter data access primitives and APIs within the data storage and management system. Such items can enable applications to offload data transaction processing and synchronization to the data storage systems, provide suggestions or hints to the data storage system, e.g., with respect to how to place or process the data, use optimal data layout or compression within the storage system, and/or request notifications from the data storage system on changes to the data or metadata, such as is described herein.

As has been noted, the various data elements described and/or referenced herein can be of practically data form, including but not limited to: files, objects, block storage, database records, key/value tuples, messages, log streams, media streams or files, time series data, etc. Moreover, such data objects can include content, metadata, versions, and/or state or context, and can be copied in multiple locations.

As has also been described herein, the described technologies can enable and enhance data storage and management in scenarios in which various usage patterns indicate that certain application data has specific substructures (e.g., that parts or portions of the data structure are used independently in relation to operation of the application). As noted, an interface that a data storage and management system uses for interfacing with applications can be modified and/or defined. Various aspects and/or details of the application data structure and/or usage pattern can be determined and/or otherwise obtained. Such a usage pattern can, for example, enable the identification of substructures of the data structure which may be used independently of the rest of the data.

Having identified such substructures, a data storage object can be designed/defined, e.g., with respect to the application. Such a data storage object can, for example, enable the substructures to be accessed as independent units. Moreover, various data access commands can be modified and/or defined, such as those which enable independent access the substructures. For example, parameters identifying the substructures can be added to certain data access commands (e.g., in relation to video data from a security camera, data read commands can include recording times as parameters). Additionally, storing of the data can be performed, e.g., using the data storage object which may be used by the API that handles the application.

One exemplary structure for a data storage object can include providing a header section and indexed subsections. Additionally, as has been noted, the present data can be divided into organic sections such that access clashes between different users may be less likely (e.g., as compared to storage in single files or arbitrary data blocks). Moreover, in cases where some of the substructures are duplicates of other substructures in the data structure, the duplicates can be stored as a reference (e.g., a pointer to the original instance of the data), thereby better utilizing storage resources.

By way of illustration, in a scenario in which the data structure includes a file with time-based entries, each entry can, for example, be a substructure. Additionally, the various entries can be indexed based on a number of criteria, e.g., based on recording time.

Additionally, as described herein, the described data storage system can include a hierarchical memory structure, which can be configured, for example, such that data that is used most often can be most readily available. The described data objects can enable each sub-structure to be placed independently on the hierarchical memory, e.g., in accordance with its own data usage pattern. Being that the referenced structures are organic, the referenced usage patterns (e.g., those that are used to identify the referenced substructures) can be more exactly reflective of usage of the data (e.g., as opposed to being averages or maximums, e.g., based on arbitrary data structures). It should also be understood that the referenced substructures can be deleted independently/on their own terms (e.g., rather than as part of an arbitrary block).

One exemplary implementation of the described technologies can be for periodic and/or ongoing scanning of various sensors (e.g., including security cameras, etc.) such that the described data entries can be periodic readings. The ability to store such readings in specifically designed objects enables such readings to be more accessible and/or useful. By way of further illustration, such data structure(s) can be a log file, with the referenced entries being independently indexed, e.g., according to time and date. By way of yet further example, in the case of video, frames and/or groups of frames can be indexed, e.g., according to the time(s) of recording (and/or such frames and groups of frames can be indexed according to metadata associated with the video structure).

It should also be noted that in the various examples provided herein, the referenced indexing need not necessarily be carried out for every data structure (e.g., it may be confined to regular and/or irregular intervals). By way of further illustration, in one implementation, the data object can be a message queue, with messages being written at a first end and being read using read pointers.

Figure 7:
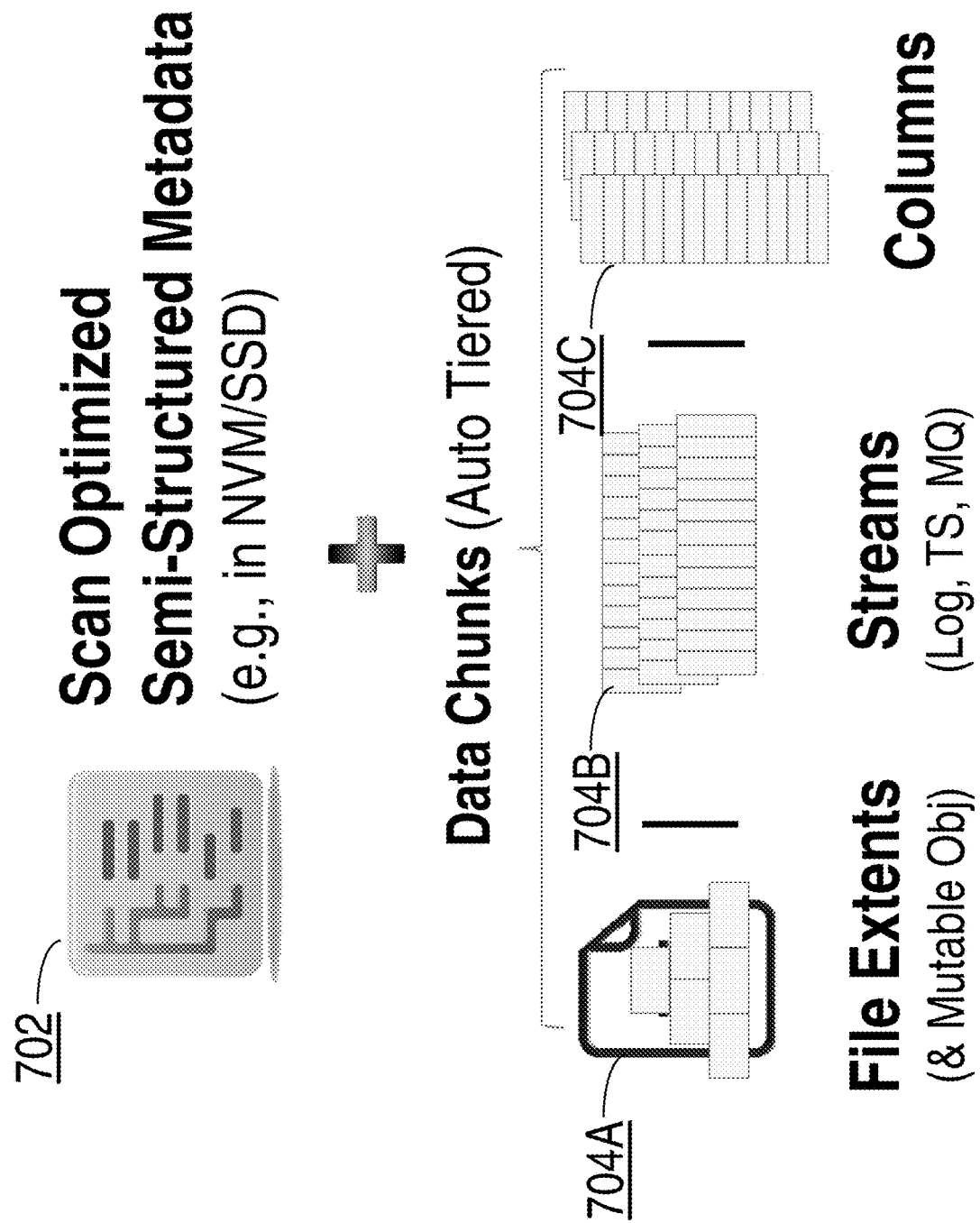
FIG. 7 depicts various aspects of a data object in accordance with one implementation of the present disclosure.

FIG. 7 depicts aspects of various data objects such as those that are described and/or referenced herein. As shown in FIG. 7, a data object 702 can be a data object (e.g., as may be created and/or provided by an application 104, e.g., for storage and/or management via the disclosed technologies). As described in detail herein, various aspects, elements and/or portions of data object 702 may be scan optimized, structured, and/or semi-structured, based on, for example, that manner in which the application (and/or other applications) provides, interacts with, and/or otherwise utilizes the data (e.g., usage pattern(s)). Additionally, object 702 can include metadata which may, for example, be stored in non-volatile memory and/or a solid state disk.

As also shown in FIG. 7, the referenced data object can further include/incorporate various data objects or chunks (each of which may store an entire file, stream, columns/fields in a database, etc.). Such a structure can enable the representation of practically any type of data via the described model. For example, the referenced data chunks can include data chunks that are configured or otherwise oriented with respect to file extents 704A (e.g., a tree or other such structure that maps the various file offsets to blocks in a disk or disks), streams 704B (e.g., chunks of data organized by timestamp and which may be continuous such that when one chunk is full, another chunk can be used to further store data, and whereby the referenced timestamps can be used to retrieve data associated with a particular timeframe from the corresponding chunk(s)), and/or columns 704C (e.g., database columns which can include, for example, images, etc., and with respect to which corresponding metadata can include pointers to such columns that include different types of data/content, e.g., pictures, text, etc.).

As noted, the described objects can be configured to store practically any type of data (e.g., files, objects, media (e.g., video) streams, data streams (e.g., sensor information), log files, time series information, database records, etc.), as each type of data can be mapped to the described data model. Moreover, as described herein, the various types of data can be stored, for example, within a single namespace, under a single policy and/or tiering policy, and/or can utilize a single search tool, etc. In doing so, considerable efficiencies can be achieved, e.g., over technologies that use the same uniform approach to storing different types of data.

It should be understood that, as described herein, each of the referenced objects can also have one or more sub-objects. Such a hierarchical structure enables practically any type of data to be stored using the described technologies. Additionally, the described technologies can enable views of the stored data to be provided which reflect the state of certain data at various points in time.

It can be appreciated that the described data storage and access technologies can be used to identify, determine, and/or otherwise select one or more storage types/media with respect to which to store the data. For example, certain types of storage may provide improved results with respect to search, indexing, and/or access, scanning, and/or querying, but may not provide comparable results with respect to direct access of the data (while other types of storage may entail the opposite results). By way of further example, certain types of file systems may entail traversing an entire directory to identify a file (as opposed to using a name/index to immediately identify a file at the end of a directory). In the described technologies, multiple types of indexing mechanisms can be provided for a single data structure (each of which can synchronize with the others). Upon receiving a request, the appropriate index can be used to retrieve the requested data. So, for example, for random access a hash function can be provided which can immediately identify the location of a file within a directory. In certain implementations, each of the referenced indexes can be configured to complement the functionality/advantages that are not present in the other indexes. For example, data ingestion can be performed using a random access/key-based index, while analytics can use an index that enables retrieval of data based on certain criteria.

In doing so, each file/object can, for example, be stored once within the described technologies while being indexed multiple ways. Thus, for example, data can be ingested in one way (e.g., using one index) while being analyzed another way (e.g., using another index).

Moreover, even if, for example, data is stored as stream, different views of the file can be provided which can access the data in different ways (thereby storing the data only once while providing virtual files which correspond to different views of the same data). For example, the streaming data can be continuously received and identifying what data maps to what portion of the data can be programmatically indicated (e.g., one view can create a virtual file for every 24 hours of streaming data). For example, a virtual file can be assigned a file name and can define which portion of the actual underlying data (e.g., a chronological interval of the ongoing stream) it maps to.

Accordingly, it can be appreciated that rather than storing data in a manner that does not account for properties/characteristics of such data and/or the manner in which such data is actually utilized, and rather than associating a particular application too closely with the storage (which may not be scalable), the described technologies enable a sufficient amount of logic/programmability to be provided at the storage (e.g., stored procedures, indexing, transactions, notifications, etc., as are described herein) in order to outsource application data processing layers to the storage in a flexible fashion which can be scaled across multiple applications. In doing so, the need to copy/move data from one system to another (e.g., in order to utilize different applications, which, it is noted, can jeopardize context and/or security, e.g., each time the data moves) can be eliminated. Doing so can also improves latency (since real-time analytics can be performed on the first/only instance of the data, without needing to wait until such data is transferred to the appropriate analytics system).

Figure 8:
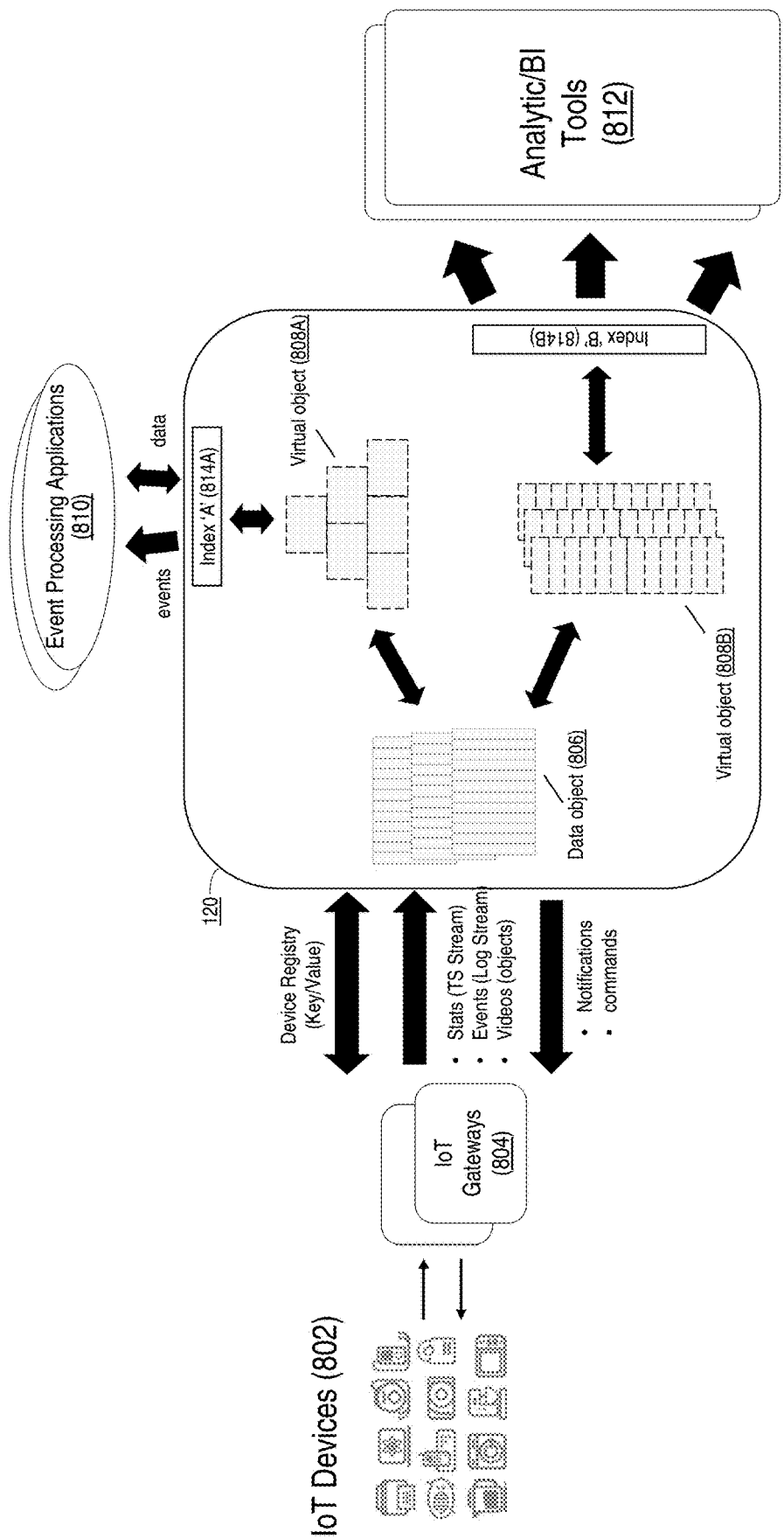
FIG. 8 depicts an exemplary implementation of the described technologies in accordance with one implementation of the present disclosure.

FIG. 8 depicts an exemplary implementation of the described technologies with respect to IoT devices/data. As depicted in FIG. 8, data can be transmitted to/from devices 802 via one or more IoT gateways 804 (in conjunction with various APIs, such as are described herein). In certain implementations, such devices can provide ongoing streaming data (e.g., ongoing streams of sensor inputs) which can be stored (e.g., as data object 806 as depicted in FIG. 8) and/or otherwise written, e.g., to a single storage platform (such as is described herein). It can be appreciated that while data object 806 may be continuously received in one format (e.g., a data stream), various other applications, services, tools, etc., may also attempt to analyze such data, e.g., in real time. For example, it may be advantageous for various event processing applications 514 and/or analytics tools 812 (e.g., Elasticsearch®, Spark™, Hadoop®, Tableu®, etc.) to monitor, analyze, etc., the received IoT data in real time. However, while the data received from the various devices 802 may be in a stream format, the referenced applications, services, tools, etc., may be configured to process data in other formats (e.g., as database columns/records, file extents, etc.). Accordingly, in lieu of converting the data from the format in which it was originally received into the format(s) required by the referenced applications, services, etc. (which, as noted, can increase latency and overhead), the described technologies can maintain a single copy of the data object 806 (e.g., in its original format) while generating one or more virtual objects 808A, 808B. As described herein, such virtual objects can correspond to and/or define various views of the data itself. In conjunction with respective indexes (e.g., index 814A, which corresponds to virtual object 808A and index 814B which corresponds to virtual object 808B) the respective applications, services, tools, etc., (e.g., applications 810 and tools 812) can provide commands, requests, etc., that pertain to the original data object (806) as reflected/represented in a corresponding virtual object which can, in turn, interface with such respective applications, services, etc., via a corresponding index. As has been noted, in doing so the received data object can be stored a single time (e.g., in its native format) while enabling other applications/services to interact with such a data object (via respective virtual objects and indexes) in a manner that corresponds to/reflects the native operations/functionality of such applications/services. In doing so, considerable efficiencies can be realized, e.g., by enabling the underlying data object to be stored once, as opposed to multiple times in multiple formats, while also enabling the referenced applications, services, tools, etc., to interact with the referenced data in real time via commands, etc., that are native to such applications, services, etc. (thereby avoiding the need to reconfigure aspects of such applications/services).

At this juncture it should be understood that various implementations of the disclosed technologies provide numerous advantages and improvements upon conventional approaches, as has been described in detail herein. By way of example, while existing technologies store and/or access data in ways that do not account for characteristics of the data itself as well as how it is utilized/accessed, the described technologies account for such (and other) factors in determining to store and/or manage such data. In doing so, the described technologies can improve and/or optimize application performance as well as utilize storage resources more efficiently. Additionally, while existing technologies may require data to be replicated and/or converted into different format(s) in order to access/utilize such data by multiple applications, services, etc., the described technologies can provide access to multiple applications, services, etc., via multiple indexes, etc., while maintaining a single copy of the data itself. In doing so, application performance and storage utilization can be optimized.

It should also be noted that while the much of the foregoing description has illustrated various aspects of the described technologies in relation to data storage and management, the described technologies can also be implemented in any number of additional or alternative settings or contexts and towards any number of additional objectives. It should be understood that further technical advantages, solutions, and/or improvements (beyond those described and/or referenced herein) may be enabled as a result of such implementations.

Figure 9:
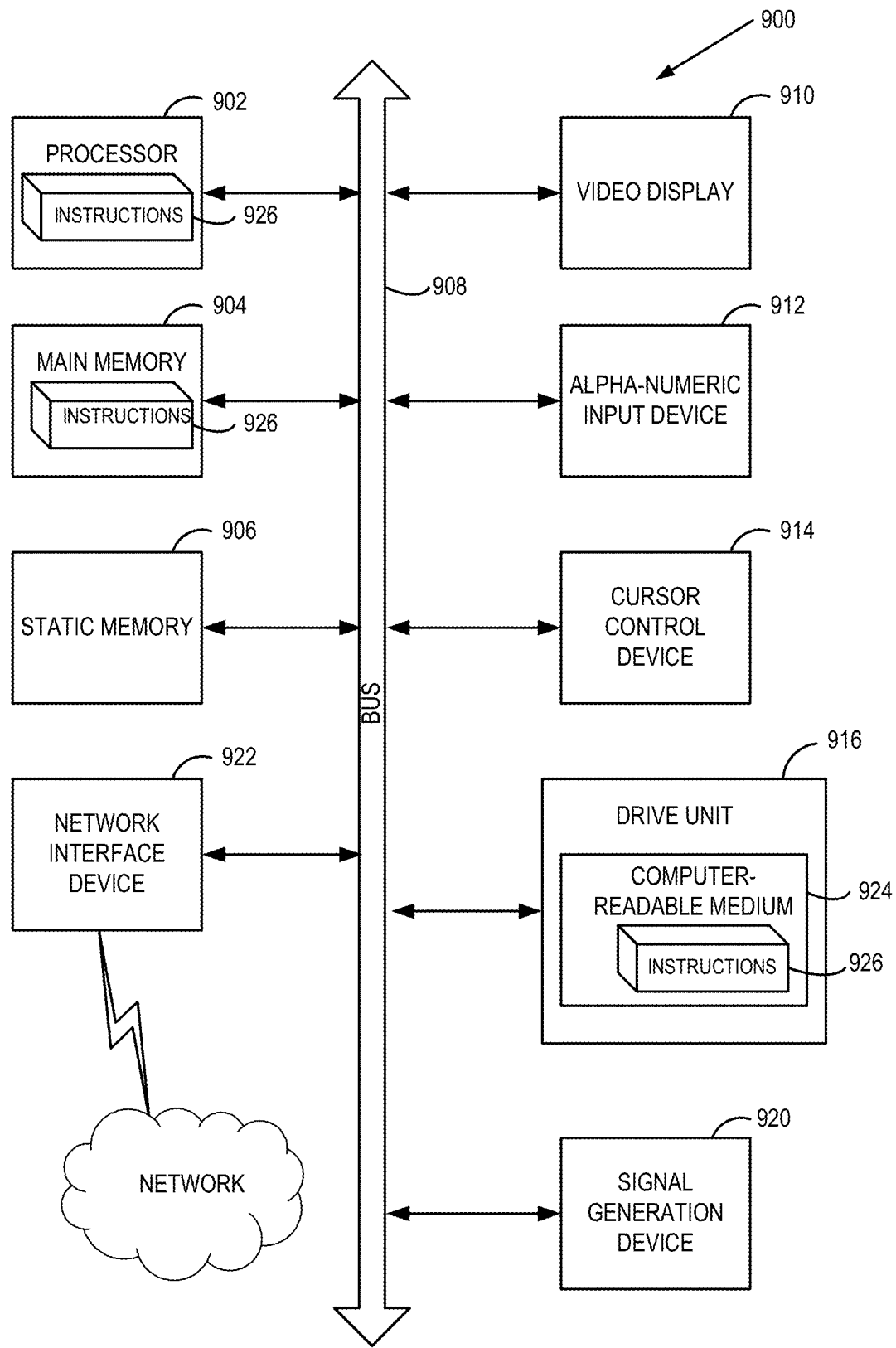
FIG. 9 depicts a block diagram of an illustrative computer system operating in accordance with aspects and implementations of the present disclosure.

FIG. 9 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server in client-server network environment. The machine may be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 908.

Processor 902 represents one or more processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions 926 which may embody any one or more of the methodologies or functions described herein. Instructions 926 may also reside, completely or at least partially, within the main memory 904 and/or within the processor 902 during execution thereof by the computer system 900, the main memory 904 and the processor 902 also constituting computer-readable media. Instructions 926 may further be transmitted or received over a network via the network interface device 922.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. In certain implementations, this apparatus may be specially constructed for the required purposes. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to practically any type of data. The scope of the disclosure should, therefore, be determined with reference to the appended claims, along with the full scope of equivalents to which such claims are entitled.

What is claimed is:

1. A computer-implemented method comprising:
   receiving a request with respect to a first data object;
   processing, by a processing device, the request to determine which of a first index or a second index to utilize in completing the request;
   completing the request via at least one of the first index or the second index;
   identifying one or more substructures of the first data object that are accessed by the request independently of one or more other substructures of the first data object;
   based on an identification of the one or more substructures of the first data object, defining a storage structure for the first data object; and
   defining an interface through which a first application can provide data access commands to the first data object as stored in the defined storage structure.

2. The method of claim 1, wherein the request is received from an application.

3. The method of claim 2, wherein processing the request comprises processing the request to determine, in view of the application, which of the first index or the second index to utilize in completing the request.

4. The method of claim 1, wherein completing the request comprises generating a virtual data object.

5. The method of claim 4, wherein the virtual data object comprises an object identifier and one or more pointers to one or more elements of the first data object.

6. The method of claim 4, wherein the virtual data object comprises an object identifier and one or more parameters that pertain to one or more elements of the first data object.

7. The method of claim 4, wherein the virtual data object comprises an object identifier and one or more elements of the first data object.

8. The method of claim 4, wherein the virtual data object comprises an object identifier, one or more pointers to one or more elements of the first data object, and one or more pointers to one or more elements of a second data object.

9. The method of claim 4, wherein the virtual data object comprises an object identifier, one or more parameters that pertain to one or more elements of the first data object, and one or more parameters that pertain to one or more elements of a second data object.

10. The method of claim 4, wherein the virtual data object comprises an object identifier, one or more elements of the first data object, and one or more elements of a second data object.

11. The method of claim 4, wherein the virtual data object comprises an object identifier, the first data object, and a second data object.

12. The method of claim 1, wherein the first data object is received from a first application and the request is received from a second application that is different from the first application.

13. The method of claim 1, wherein the first data object and the request are received from the same application.

14. The method of claim 1, wherein processing the request comprises processing the request to determine one or more usage patterns of the first application with respect to the first data object.

15. The method of claim 14, wherein processing the request further comprises identifying the one or more substructures of the first data object based on the one or more usage patterns of the first application with respect to the first data object.

16. The method of claim 1, wherein processing the request comprises processing the first data object to identify the one or more substructures of the first data object.

17. The method of claim 1, wherein the storage structure for the first data object comprises a storage structure than enables independent access to each of the one or more substructures.

18. The method of claim 1, wherein defining an interface through which the first application can provide data access commands comprises adding one or more parameters to the request, the one or more parameters identifying at least one of the one or more substructures.

19. The method of claim 1, wherein defining an interface comprises defining one or more interfaces through which the first application can provide data access commands to the first data object as stored in the defined storage structure.

20. The method of claim 1, wherein defining an interface comprises defining a plurality of interfaces through which the first application can provide data access commands to the first data object as stored in the defined storage structure.

21. The method of claim 1, further comprising:
receiving at least one data access command with respect to at least one of the one or more substructures of the first data object; and
generating one or more notifications that correspond to the at least one data access command.

22. The method of claim 21, further comprising providing the one or more notifications to the first application.

23. The method of claim 21, further comprising providing the one or more notifications to a second application that is different than the first application.

24. The method of claim 21, wherein the at least one data access command comprises at least one of: a data creation command directed to the at least one of the one or more substructures of the first data object, a data modification command directed to the at least one of the one or more substructures of the first data object, or a data deletion command directed to the at least one of the one or more substructures of the first data object.

25. The method of claim 21, wherein generating one or more notifications comprises generating the one or more notifications in response to receipt of the at least one data access command.

26. The method of claim 21, wherein generating one or more notifications comprises generating the one or more notifications in response to execution of the at least one data access command with respect to the at least one of the one or more substructures of the first data object.

27. The method of claim 1, further comprising:
determining a first usage pattern with respect to a first substructure of the first data object; and
storing the first substructure of the first data object on a first storage resource based on the first usage pattern.

28. The method of claim 27, further comprising:
determining a second usage pattern with respect to a second substructure of the data object that is different from the first substructure of the first data object; and
storing the second substructure of the first data object on a second storage resource that is different from the first storage resource based on the second usage pattern.

29. A system comprising:
a processing device; and
a memory, coupled to the processing device and storing instructions that, when executed by the processing device, cause the system to perform operations comprising:
receiving a request with respect to a first data object;
processing the request to determine which of a first index or a second index to utilize in completing the request;
completing the request via at least one of the first index or the second index;
identifying one or more substructures of the first data object that are accessed by the request independently of one or more other substructures of the first data object;
based on an identification of the one or more substructures of the first data object, defining a storage structure for the first data object; and
defining an interface through which a first application can provide data access commands to the first data object as stored in the defined storage structure.

30. A non-transitory computer-readable medium having instructions encoded thereon that, when executed by a processing device, cause the processing device to perform operations comprising:
receiving a request with respect to a first data object;
processing the request to determine which of a first index or a second index to utilize in completing the request;
completing the request via at least one of the first index or the second index;
identifying one or more substructures of the first data object that are accessed by the request independently of one or more other substructures of the first data object;
based on an identification of the one or more substructures of the first data object, defining a storage structure for the first data object; and
defining an interface through which a first application can provide data access commands to the first data object as stored in the defined storage structure.

31. The system of claim 29, wherein the request is received from an application and wherein processing the request comprises processing the request to determine, in view of the application, which of the first index or the second index to utilize in completing the request.

32. The system of claim 29, wherein the first data object is received from a first application and the request is received from a second application that is different from the first application.

\* \* \* \* \*